United States Patent
Guo et al.

(10) Patent No.: US 8,222,870 B2
(45) Date of Patent: Jul. 17, 2012

(54) BATTERY MANAGEMENT SYSTEMS WITH ADJUSTABLE CHARGING CURRENT

(75) Inventors: Jiankui Guo, Shenzhen (CN); Ruichao Tang, Shenzhen (CN); Guoxing Li, Sunnyvale, CA (US); Xiaohua Hou, Shanghai (CN); Zhenming Zhang, Wuhan (CN)

(73) Assignee: O2Micro, Inc, Santa Clara, CA (US)

( * ) Notice: Subject to any disclaimer, the term of this patent is extended or adjusted under 35 U.S.C. 154(b) by 298 days.

(21) Appl. No.: 12/080,034

(22) Filed: Mar. 31, 2008

(65) Prior Publication Data
US 2008/0218130 A1 Sep. 11, 2008

Related U.S. Application Data

(63) Continuation-in-part of application No. 11/821,042, filed on Jun. 20, 2007.

(60) Provisional application No. 60/905,679, filed on Mar. 7, 2007.

(51) Int. Cl.
*H02J 7/04* (2006.01)
*H02J 7/00* (2006.01)
*H02J 7/16* (2006.01)

(52) U.S. Cl. ........ 320/162; 320/130; 320/134; 320/145; 320/149

(58) Field of Classification Search ................ 320/162, 320/134
See application file for complete search history.

(56) References Cited

U.S. PATENT DOCUMENTS

| | | | |
|---|---|---|---|
| 5,684,382 A | 11/1997 | Fritz et al. | |
| 5,872,444 A | 2/1999 | Nagano | |
| 5,903,137 A | 5/1999 | Freiman et al. | |
| 6,208,117 B1 * | 3/2001 | Hibi | 320/134 |
| 6,268,710 B1 * | 7/2001 | Koga | 320/116 |
| 6,329,796 B1 | 12/2001 | Popescu | |
| 6,653,817 B2 | 11/2003 | Tate, Jr. | |
| 6,741,066 B1 | 5/2004 | Densham et al. | 320/145 |
| 6,853,165 B2 | 2/2005 | Chen | 320/137 |
| 7,081,737 B2 * | 7/2006 | Liu et al. | 320/130 |
| 7,088,076 B2 | 8/2006 | Densham et al. | 320/145 |
| 7,176,654 B2 | 2/2007 | Meyer et al. | 320/110 |
| 7,262,580 B2 | 8/2007 | Meyer et al. | 320/110 |
| 7,285,936 B2 | 10/2007 | Ohnuma et al. | |
| 7,312,219 B2 | 12/2007 | Dang et al. | 514/252.1 |

(Continued)

FOREIGN PATENT DOCUMENTS
CN 1395756 A 2/2003
(Continued)

OTHER PUBLICATIONS

English translation of first Office Action JP 2007-238300 Jan. 27, 2009.

*Primary Examiner* — Yalkew Fantu

(57) ABSTRACT

A battery management system includes a monitoring circuit and a charger. The monitoring circuit is operable for monitoring a battery pack that includes a plurality of cells, and for checking an unbalanced condition of the battery pack in each cycle of a plurality of cycles. The charger is operable for controlling a charging current to the battery pack and for receiving monitoring information from the monitoring circuit, and for adjusting the charging current from a first level in a previous cycle to a second level that is lower than the first level in response to a detection of the unbalanced condition in a current cycle.

23 Claims, 12 Drawing Sheets

U.S. PATENT DOCUMENTS

| | | | |
|---|---|---|---|
| 7,323,847 B2 | 1/2008 | Meyer et al. | 320/110 |
| 7,345,451 B2 | 3/2008 | Chen | |
| 7,622,830 B2 | 11/2009 | Cioaca et al. | |
| 2002/0060554 A1 | 5/2002 | Odaohhara | |
| 2002/0069000 A1 | 6/2002 | Nakao | |
| 2002/0191421 A1 | 12/2002 | Liao et al. | |
| 2004/0178766 A1 | 9/2004 | Bucur et al. | |
| 2006/0107763 A1 | 5/2006 | Paek | |
| 2006/0145658 A1* | 7/2006 | Wang | 320/107 |
| 2006/0164038 A1* | 7/2006 | Demers et al. | 320/116 |
| 2006/0291259 A1 | 12/2006 | Densham et al. | 363/63 |
| 2007/0273334 A1 | 11/2007 | Meyer | 320/138 |
| 2007/0284159 A1 | 12/2007 | Takami et al. | |
| 2008/0030168 A1 | 2/2008 | Hsu et al. | 320/119 |

FOREIGN PATENT DOCUMENTS

| | | |
|---|---|---|
| CN | 1471192 A | 1/2004 |
| CN | 2676428 Y | 2/2005 |
| CN | 101145698 A | 3/2008 |
| EP | 1796243 A2 | 6/2007 |
| JP | 2266836 A | 10/1990 |
| JP | 9285026 A | 10/1997 |
| JP | 11027807 A | 1/1999 |
| JP | 2000-197212 A | 7/2000 |
| JP | 2004-172058 A | 6/2004 |
| JP | 2005151683 A | 6/2005 |
| JP | 2007-115472 A | 10/2007 |

\* cited by examiner

BATTERY MANAGEMENT SYSTEMS WITH ADJUSTABLE CHARGING CURRENT

RELATED APPLICATIONS

This application is a continuation-in-part of the co-pending U.S. application Ser. No. 11/821,042, titled "Battery Management Systems with Controllable Adapter Output", filed on Jun. 20, 2007, which itself claims priority to U.S. Provisional Application No. 60/905,679, filed on Mar. 7, 2007, which is hereby incorporated by reference in its entirety.

TECHNICAL FIELD

The present invention relates to battery management systems, and in particular to battery management systems with adjustable charging current.

BACKGROUND ART

FIG. 1 shows a block diagram of a conventional battery charging circuit 100. As shown in FIG. 1, the battery charging circuit 100 is implemented by an adapter 102, a pulse width modulation controller 108, a charger controller 110, and a battery protection circuit (not shown) in the battery pack 104. The adapter 102 outputs a fixed voltage, and a charger 106 (shown as the pulse width modulation controller 108 and the charger controller 110) steps down the output voltage of the adapter 102 by controlling power switches and a buck converter in block 112. Consequently, conventional battery charging circuits can be relatively large and costly.

FIG. 2 shows a block diagram of another conventional charging circuit 200. The charging circuit 200 includes a controllable adapter 202 and an external control chip shown as a charger controller 210. The external control chip (charger controller 210) controls an output power of the controllable adapter 202 according to a current/voltage of the battery pack 204. As shown in FIG. 2, the charging circuit 200 also needs an extra switch 212 to control a charging current of the battery pack 204. As a result, such battery charging circuits are also relatively large and costly.

Furthermore, in conventional charging circuits, due to unbalancing issues (e.g., cells in the battery pack may have different voltages/capacities), some cells may reach an overvoltage condition even though others have not yet been fully charged. In other words, the charging process may not be accurate enough across all of the cells.

SUMMARY

According to one embodiment of the invention, a battery management system includes a monitoring circuit and a charger. The monitoring circuit is operable for monitoring a battery pack with a plurality of cells, and for checking an unbalanced condition of the battery pack in each cycle of a plurality of cycles. The charger is operable for controlling a charging current to the battery pack and for receiving monitoring information from the monitoring circuit, and for adjusting the charging current from a first level in a previous cycle to a second level that is lower than the first level in response to a detection of the unbalanced condition in a current cycle.

BRIEF DESCRIPTION OF THE DRAWINGS

Features and advantages of embodiments of the invention will become apparent as the following detailed description proceeds, and upon reference to the drawings, where like numerals depict like elements, and in which.

DETAILED DESCRIPTION

Reference will now be made in detail to the embodiments of the present invention. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims.

Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, components, and circuits have not been described in detail as not to unnecessarily obscure aspects of the present invention.

In one embodiment, the present invention provides a battery management system with a controllable adapter output. In one such embodiment, the battery management system can adjust the adapter output (e.g., adapter output power, adapter output voltage, and adapter output current) according to individual cell status (e.g., cell voltage, cell current, cell temperature, and cell capacity) by a control circuit integrated in a battery pack, which saves space and reduces cost. As a result, the battery management system in the present invention is able to enable multiple charging modes (e.g., standard constant current charging mode, light constant current charging mode, standard constant voltage charging mode, light constant voltage charging mode) according to individual cell status. In one embodiment, battery charging will be terminated when all the cells are fully charged and so any undesirable condition (e.g., over-voltage, over-charge, over-current) can be avoided.

Figure 1:
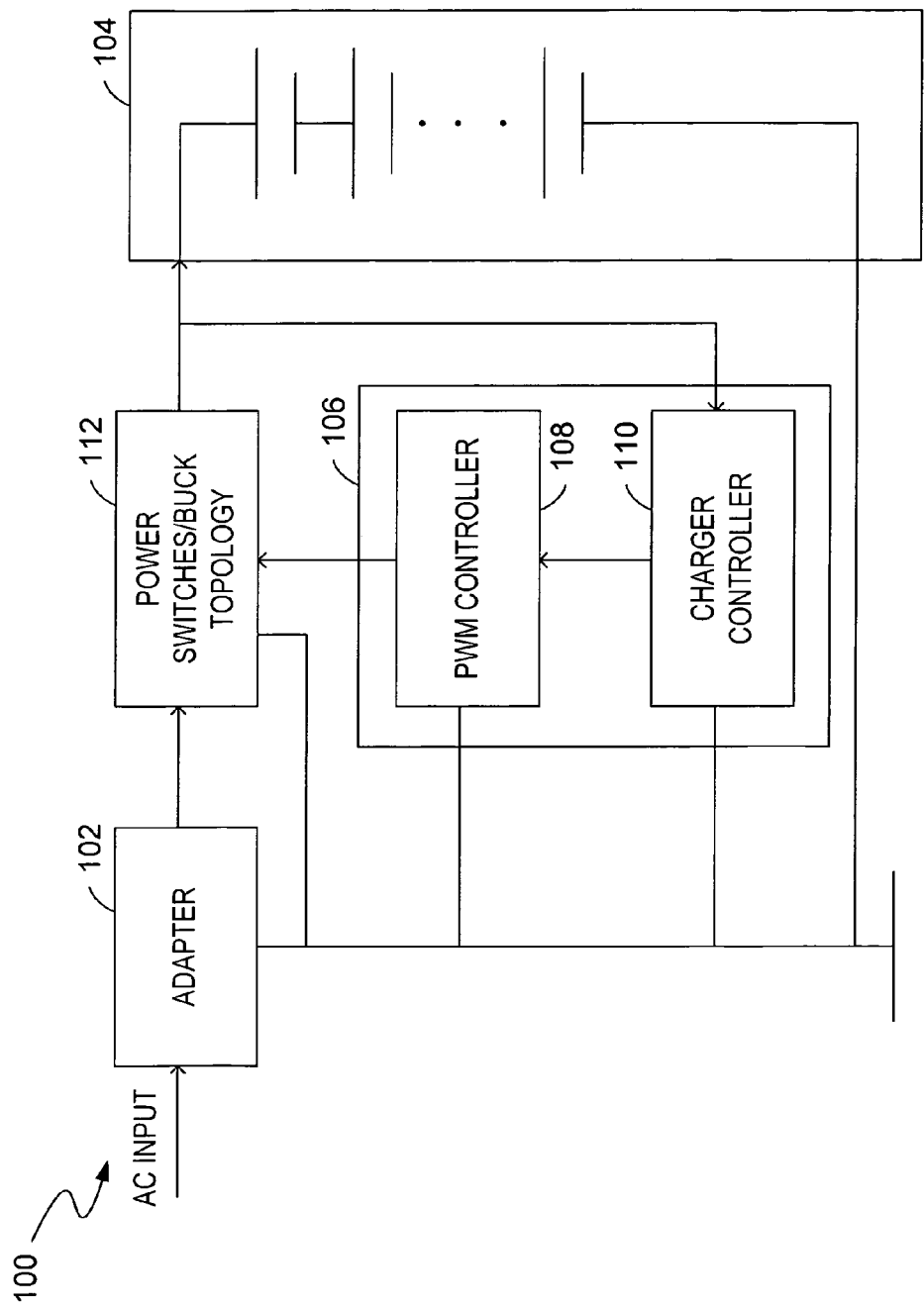
FIG. 1 shows a block diagram of a conventional battery charging circuit.
Figure 2:
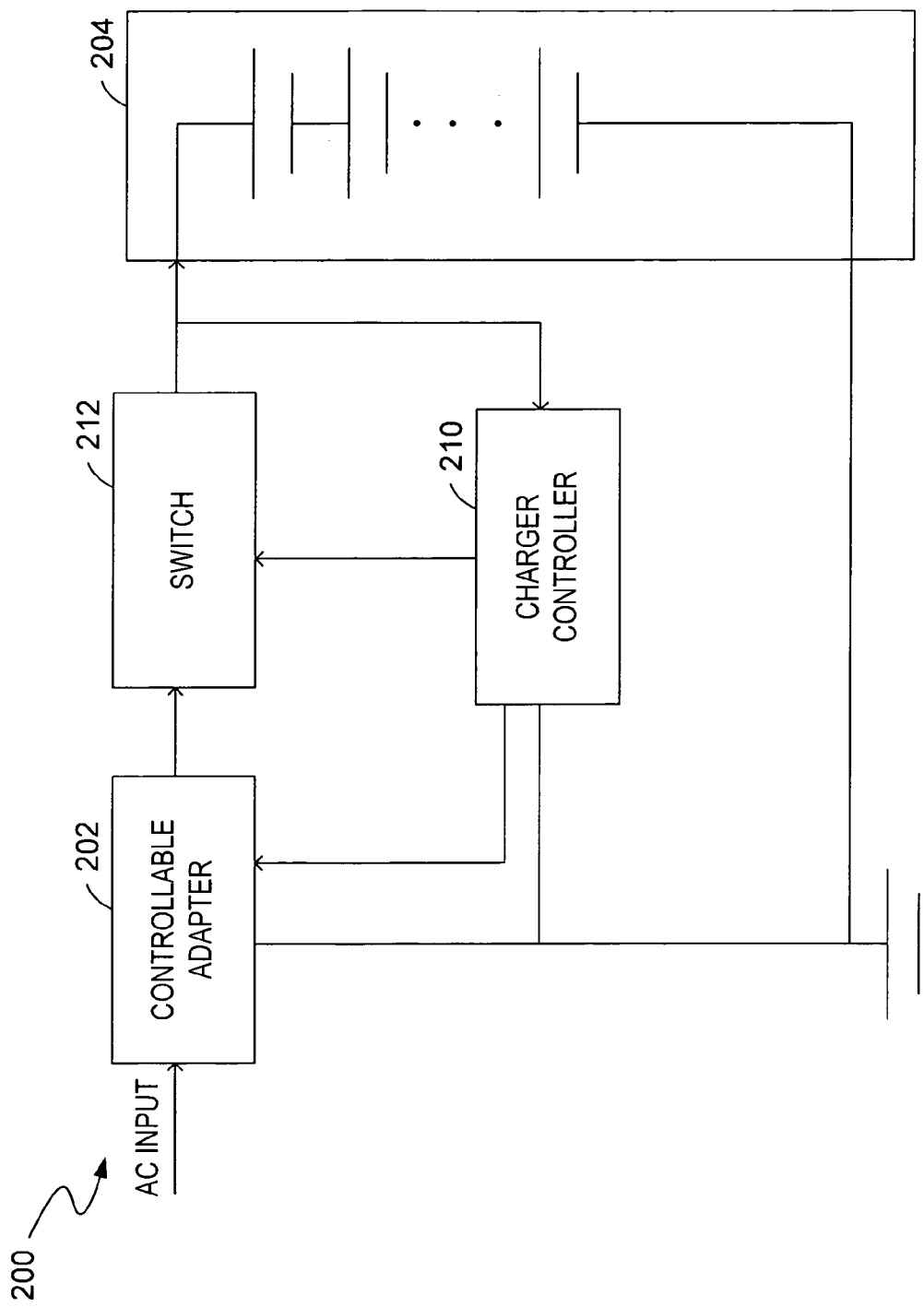
FIG. 2 shows a block diagram of a conventional charging circuit.
Figure 3:
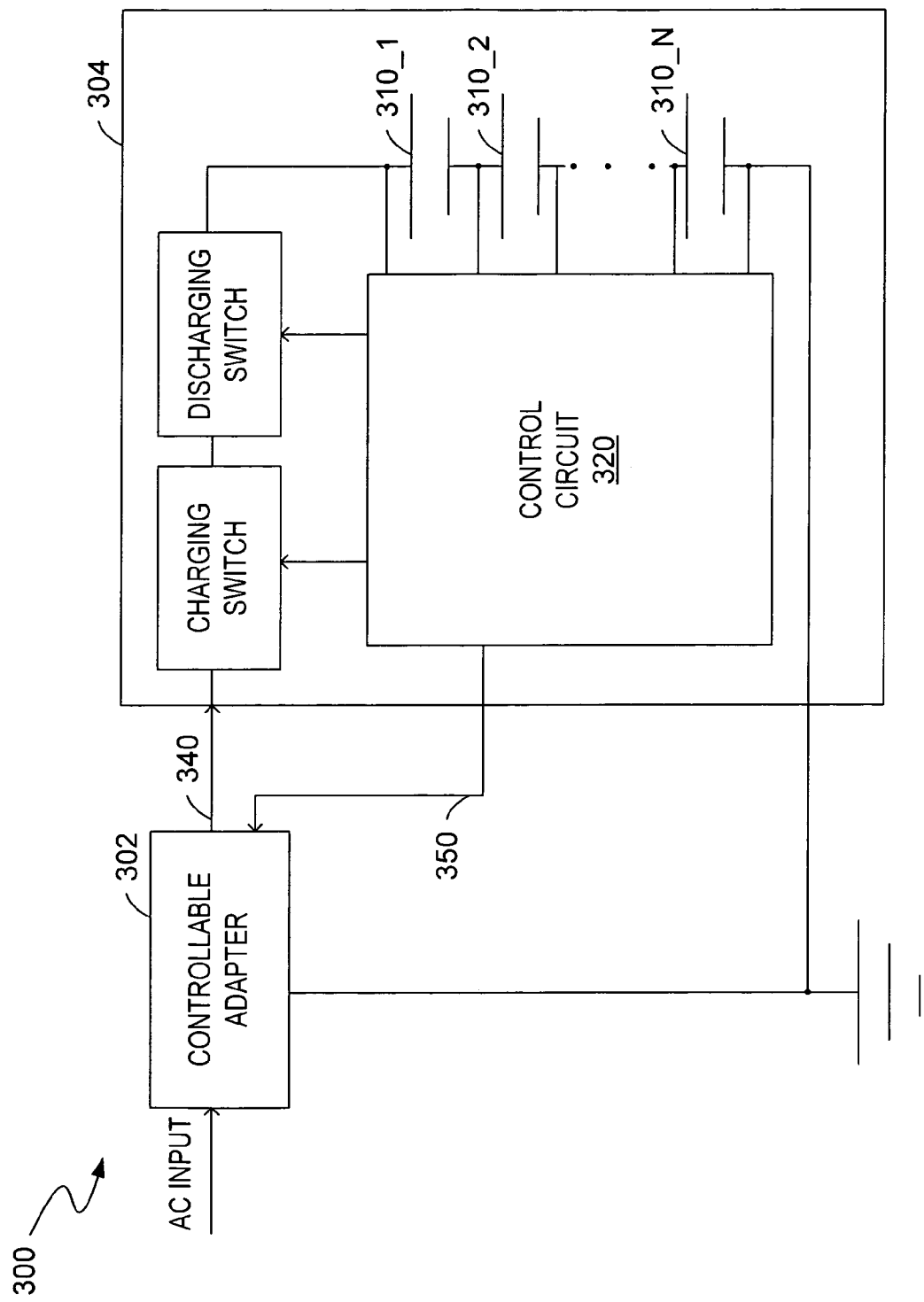
FIG. 3 shows a block diagram of a battery management system, in accordance with one embodiment of the present invention.

FIG. 3 shows a block diagram of a battery management system 300, in accordance with one embodiment of the present invention. The battery management system 300 includes an adapter 302 (e.g., a controllable adapter) for charging a battery pack 304 which has a plurality of cells 310_1-310_N (not all the cells 310_1-310_N are shown in FIG. 3 for purposes of brevity and clarity).

A control circuit 320 can be used to monitor the battery pack 304 and generate a control signal 350 for controlling an output power of the adapter 302 in order to enable multiple charging modes, in one embodiment. More specifically, the control circuit 320 can be used to generate a control signal 350 according to a status (e.g., cell voltage, cell current, cell temperature, and cell capacity) of each cell of the plurality of cells 310_1-310_N in the battery pack 304. In one embodiment, the adapter 302 coupled to the control circuit 320 charges the battery pack 304. Advantageously, an output power at an output 340 of the adapter 302 can be adjusted according to the control signal 350.

In one embodiment, the control circuit 320 is integrated in the battery pack 304. As such, the battery pack 304 is able to control the output 340 of the controllable adapter 302 directly according to individual cell status. Therefore, external control chips (e.g., charger controllers) and external power switches can be avoided.

In one embodiment, the control circuit 320 enables, but is not limited to, a standard constant current charging mode $CC_n$ (n=0), one or more light constant current charging mode $CC_n$ (n=1,2, ... , max, where max is a predetermined maximum number of n, which indicates the number of different light constant current charging modes), a standard constant voltage charging mode $CV_m$ (m=0), one or more light constant voltage charging mode $CV_m$ (m=1,2, ... , max', where max' is a predetermined maximum number of m, which indicates the number of different light constant voltage modes), and a charging termination mode. In one embodiment, a light constant current charging mode or a light constant voltage charging mode can be enabled when an unbalanced condition occurs. In one embodiment, the charging termination mode can be enabled when any undesirable/error condition occurs or when all the cells are fully charged.

Advantageously, a standard constant current charging mode $CC_0$ is enabled when the control signal 350 controls the adapter 302 to provide a substantially constant charging current $l_0$ at output 340, in one embodiment. The term "substantially constant" in the present disclosure means that the charging current/voltage can vary but within a range such that the battery pack 304 can be charged safely, in one embodiment. As such, the battery pack 304 is charged by a substantially constant charging current $l_0$. A light constant current charging mode $CC_n$ (n=1,2, ... , max) is enabled when the control signal 350 controls the adapter 302 to provide a substantially constant light charging current $l_n$ (n=1,2, ... , max) at output 340, in one embodiment. As such, the battery pack 304 is charged by a substantially constant light charging current $l_n$ (n=1,2, ... , max). In one embodiment, $l_0 > l_1 > l_2 > ... > l_{max}$.

Similarly, a standard constant voltage charging mode $CV_0$ is enabled when the control signal 350 controls the adapter 302 to provide a substantially constant charging voltage $V_0$ at output 340, in one embodiment. As such, the battery pack 304 is charged by a substantially constant charging voltage $V_0$. A light constant voltage charging mode $CV_m$ (m=1,2, ... , max') is enabled when the control signal 350 controls the adapter 302 to provide a substantially constant light charging voltage $V_m$ (m=1,2, ... , max') at output 340, in one embodiment. As such, the battery pack 304 is charged by a substantially constant light charging voltage $V_m$ (m=1,2, ... , max'). In one embodiment, $V_0 > V_1 > V_2 > ... > V_{max'}$.

Advantageously, by enabling different charging modes ($CC_0, CC_1, ..., CC_{max}$ and $CV_0, CV_1, ..., CV_{max'}$) according to individual cell status, all the cells 310_1-310_N can be fully charged and any undesirable condition can be avoided, thereby extending the battery life.

As described above, in one embodiment, the control circuit 320 monitors individual cell status and controls an output power of the adapter 302 in order to enable multiple charging modes ($CC_0, CC_1, ..., CC_{max}$ and $CV_0, CV_1, ..., CV_{max'}$). In another embodiment, a control circuit can also be implemented outside the battery pack 304, which monitors battery pack 304 (e.g., battery pack voltage and battery pack current) and generates a control signal to enable multiple charging modes ($CC_0, CC_1, ..., CC_{max}$ and $CV_0, CV_1, ..., CV_{max'}$).

Figure 4:
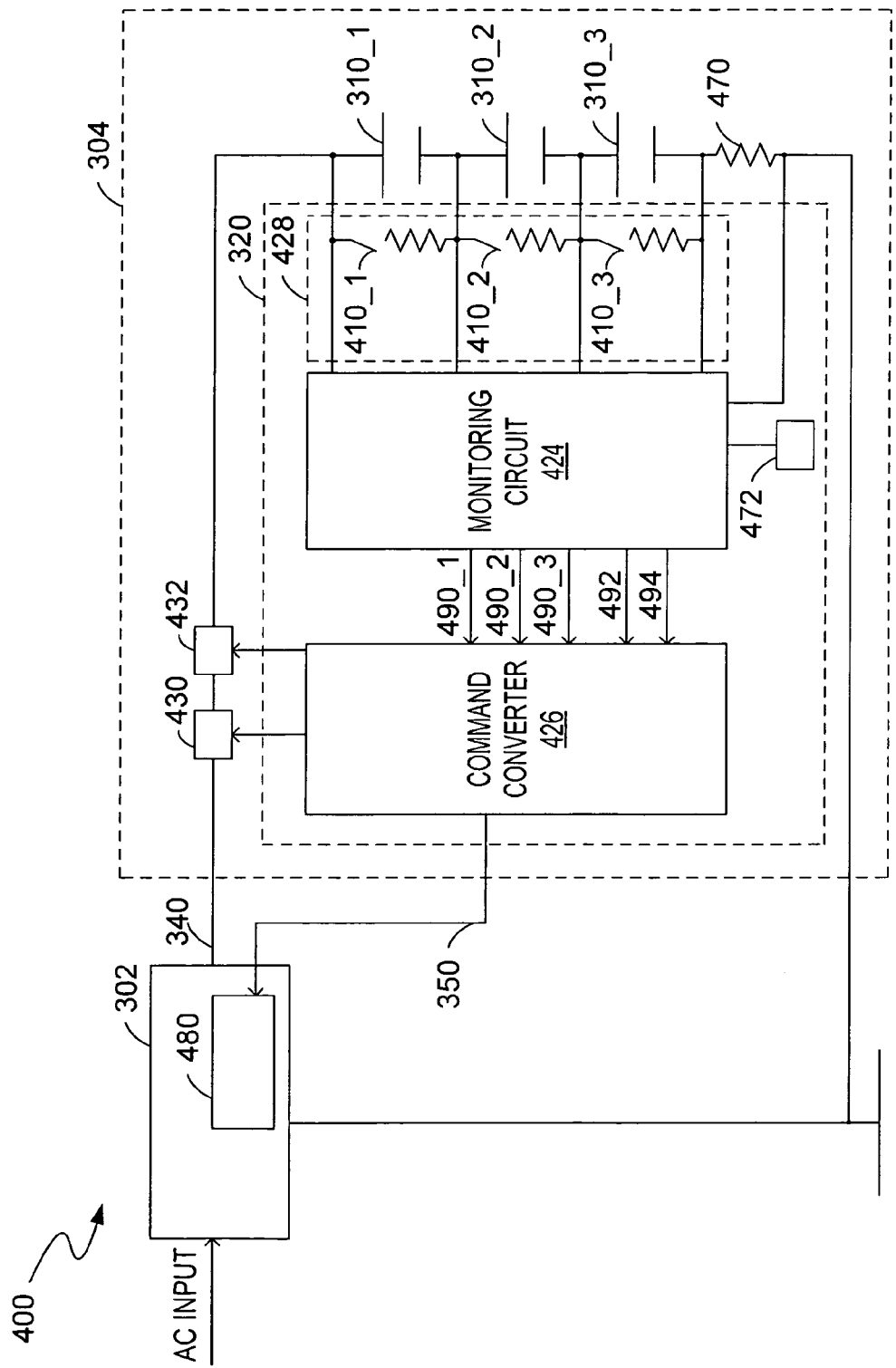
FIG. 4 shows another block diagram of a battery management system, in accordance with one embodiment of the present invention.

FIG. 4 shows another block diagram of a battery management system 400, in accordance with one embodiment of the present invention. Elements that are labeled the same as in FIG. 3 have similar functions and will not be repetitively described herein for purposes of brevity and clarity. The battery management system 400 includes a monitoring circuit 424 for monitoring the battery pack 304 which includes a plurality of cells, and for checking an unbalanced condition and/or other undesirable conditions (e.g., over-voltage, over-current, over-temperature, over-charge) of the battery pack 304 in each cycle of a plurality of cycles. In the example of FIG. 4, the battery pack 304 includes three cells 310_1, 310_2, and 310_3. The battery management system 400 also includes an adapter 302 (e.g., a charger) for controlling a charging current to the battery pack 304, for receiving monitoring information from the monitoring circuit 424, and for adjusting the charging current from a first level in a previous cycle to a second level that is lower than the first level if an unbalanced condition and/or other undesirable conditions are detected in a current cycle.

In one embodiment, an unbalanced condition occurs if a voltage difference between two cells of the plurality of cells is greater than a predetermined voltage difference. In one embodiment, an undesirable condition, e.g., an over-voltage condition, occurs if a cell voltage or a pack voltage is greater than a predetermined voltage.

In FIG. 4, the monitoring circuit 424 (e.g., a gas gauge circuit) is configured to monitor a cell status (e.g., cell voltage, cell current, cell temperature, and cell capacity) for each individual cell 310_1-310_3, and protect each cell 310_1-310_3 from any unbalanced and/or other undesirable conditions (e.g., over-voltage, over-current, over-temperature, and over-charge). In one embodiment, the monitoring circuit 424 monitors each cell 310_1-310_3 and generates a monitoring signal for each cell 310_1-310_3 indicative of the cell status.

For example, the monitoring circuit 424 monitors voltages of cells 310_1-310_3 and generates monitoring signals 490_1-490_3 indicating voltages of cells 310_1-310_3, respectively. In one embodiment, since all the cells 310_1-310_3 have the same current, the monitoring circuit 424 monitors a battery current via a sensing resistor 470 and generates a monitoring signal 492 indicating the battery current. In one embodiment, the monitoring circuit 424 also monitors a battery temperature via a temperature sensor 472, and generates a monitoring signal 494 indicating the battery temperature. In one embodiment, the monitoring circuit can also monitor capacities of cells 310_1-310_3 and generates monitoring signals (not shown in FIG. 4 for purposes of brevity and clarity) indicating capacities of cells 310_1-310_3, respectively.

Advantageously, in one embodiment, a command converter 426 coupled to the monitoring circuit 424 generates a control signal 350 according to monitoring signals 490_1-490_3, 492 and 494. More specifically, the command converter 426 integrated in the battery pack 304 can be used to generate the control signal 350 for controlling an output power of the adapter 302 based on individual cell status. Accordingly, different charging modes can be enabled according to individual cell status, in one embodiment. The command converter 426 can also be implemented outside the battery pack 304. In one such embodiment, the battery management system 400 can include a communication channel coupled between the battery pack 304 and the charger 302 for transferring the control signal 350. In other words, the communication channel between the battery pack 304 and the charger 302 can transfer monitoring information from monitoring circuit 424 in the battery pack 304 to the adapter (charger) 302. As such, the command converter 426 can receive monitoring information, e.g., monitoring signals 490_1-490_3, 492 and 494, via the communication channel. The communication channel can be a serial bus, e.g., a 1-wire bus or a 2-wire bus (e.g., SMBus bus and I²C bus, etc.).

In one embodiment, the command converter 426 can be implemented by a processor (e.g., a microprocessor) or a state machine. In one embodiment, the command converter 426 enables, but is not limited to, a standard constant current charging mode $CC_n$ (n=0), one or more light constant current charging mode $CC_n$ (n=1,2, ..., max), one or more standard constant voltage charging mode $CV_m$ (m=0), light constant voltage charging mode $CV_m$ (m=1,2, ..., max'), and a charging termination mode.

In one embodiment, the control signal 350 is analog control signal. The analog control signal 350 can be used to control a duty cycle of a pulse width modulation signal generated by a pulse width modulation signal generator 480. In one embodiment, the pulse width modulation signal generator 480 is in the adapter 302. By adjusting the duty cycle of the pulse width modulation signal, the output power of the adapter 302 at output 340 can be adjusted accordingly. In other words, different charging modes can be enabled by controlling the duty cycle of the pulse width modulation signal in the adapter 302, in one embodiment. For example, if a standard constant current charging mode ($CC_0$) needs to be enabled according to individual cell status, the analog control signal 350 will adjust the duty cycle of the pulse width modulation signal, such that the adapter 302 outputs a constant current $I_0$.

In one embodiment, the control signal 350 is a digital control signal. A decoder can be implemented in the adapter 302 to convert the digital control signal 350 to an analog control signal in order to control the duty cycle of the pulse width modulation signal in the adapter 302, in one embodiment.

Furthermore, the command converter 426 also controls a charging switch 430 and a discharging switch 432 in the battery pack 304, in one embodiment. In one embodiment, battery charging will be terminated when the charging switch 430 is switched off. The discharging switch 432 will be switched on when the battery pack 304 provides power to a system load (not shown in FIG. 4), in one embodiment.

In one embodiment, a cell balancing circuit 428 for balancing cells 310_1-310_3 is included in the battery pack 304 in order to improve performance of cells 310_1-310_3. The cell balancing circuit 428 can balance the plurality of cells, e.g., cells 310_1-310_3, in the battery pack 304 if an unbalanced condition is detected.

The cell balancing circuit 428 can be implemented outside the monitoring circuit 424 or inside the monitoring circuit 424. In one embodiment, a bleeding current (bypass current) can be enabled by the cell balancing circuit 428 for an unbalanced cell. As shown in the cell balancing circuit 428, a bleeding current of cell 310_1 is enabled when a switch 410_1 is switched on. A bleeding current of cell 310_2 is enabled when a switch 410_2 is switched on. A bleeding current of cell 310_3 is enabled when a switch 410_3 is switched on. Switches 410_1-410_3 can be controlled by the monitoring circuit 424 or the command converter 426. As such, the cell balancing circuit 428 can be controlled by the monitoring circuit 424 or the command converter 426.

Cell unbalanced conditions in the present disclosure may include, but are not limited to, the following conditions. In one embodiment, a cell is unbalanced when the cell has a voltage difference relative to any other cell, where that voltage difference exceeds a predetermined voltage difference ΔV. In another embodiment, a cell is unbalanced when the cell has a voltage which exceeds a predetermined threshold voltage Vbalance. In yet another embodiment, a cell is unbalanced when the cell has a $$\frac{dV}{dt}$$

(a differential in cell voltage with respect to a differential in charging time) that exceeds a predetermined threshold $$\left(\frac{dV}{dt}\right)_{th}.$$

In yet another embodiment, a cell is unbalanced when the cell has a capacity difference relative to any other cell, where that capacity difference exceeds a predetermined capacity difference ΔC.

Advantageously, as described above, the adapter 302 will charge the battery pack 304 with a smaller charging current (light constant current charging mode) when an unbalanced condition occurs. Therefore, the cell balancing circuit 428 can have a longer time to perform cell balancing (by enabling bleeding current) in order to fully charge all the cells.

Figure 5:
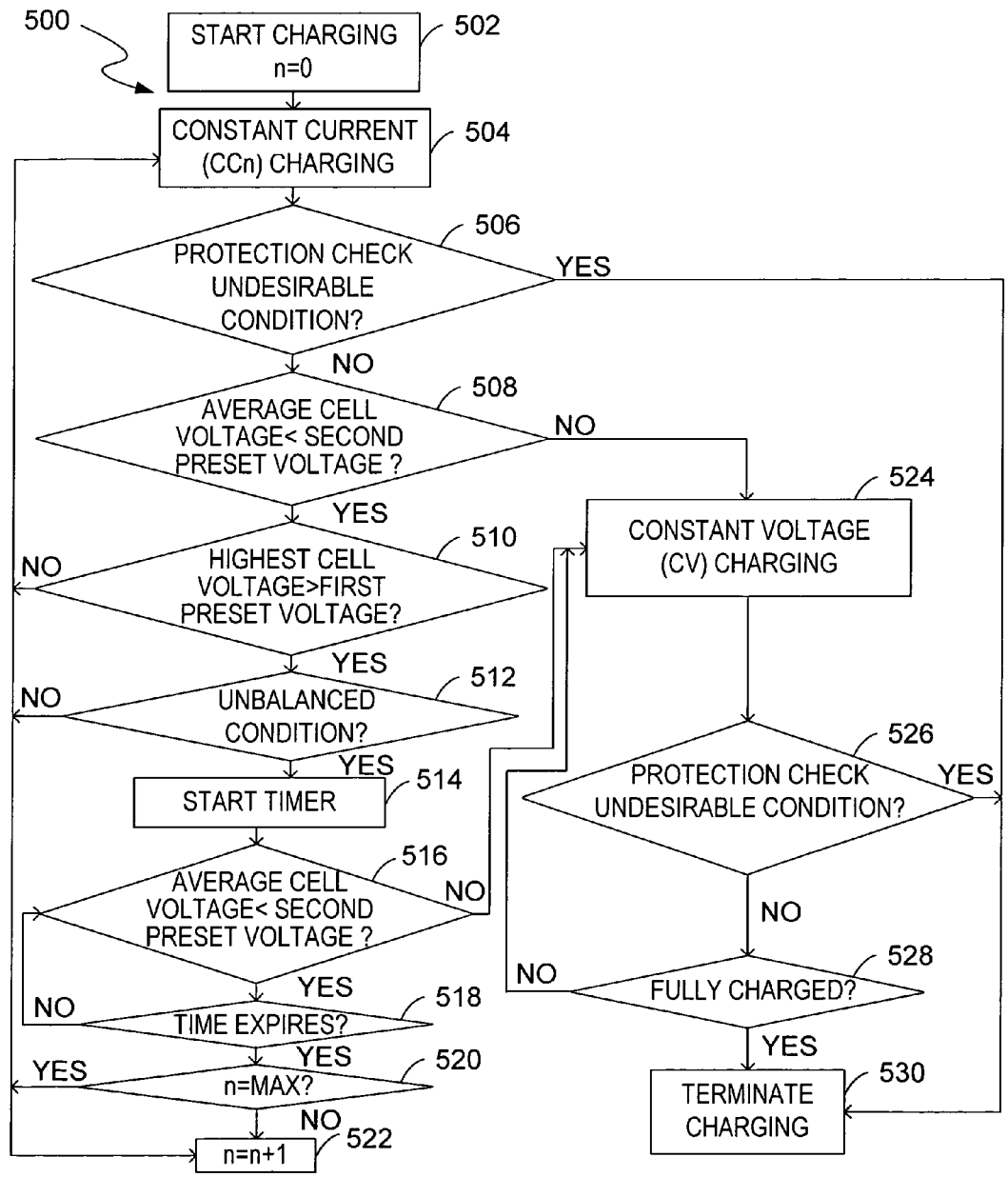
FIG. 5 shows a flowchart of operations performed by a battery management system, in accordance with one embodiment of the present invention.

FIG. 5 shows a flowchart 500 of operations performed by a battery management system 400, in accordance with one embodiment of the present invention. In one embodiment, the command converter 426 can be configured, such that the battery management system 400 in FIG. 4 operates in a way shown in flowchart 500. More specifically, flowchart 500 illustrates which charging mode will be enabled by the command converter 426 according to different cell status, in one embodiment. FIG. 5 is described in combination with FIG. 3 and FIG. 4.

In the example of FIG. 5, the battery management system 400 charges the battery pack 304 in multiple cycles. The battery management system 400 first charges the battery pack 304 in a standard constant current charging mode $CC_0$, in one embodiment. The battery management system 400 charges the battery pack 304 in light constant current charging modes $CC_n$ (n=1,2, ..., max) if any unbalanced condition occurs, in one embodiment. If a highest cell voltage (e.g., if cell 310_1 has a voltage of 3.80V, cell 310_2 has a voltage of 3.90V, and cell 310_3 has a voltage of 4.05V, then the highest cell voltage is equal to 4.05V) of the battery pack 304 is greater than a first preset voltage (e.g., 3.9V for Lithium Ion cells), the battery management system 400 will perform an unbalance check to see if there is any unbalanced condition, in one embodiment. In one embodiment, when there is an unbalanced condition, the battery management system 400 not only enables a bleeding current for any unbalanced cell by the cell balancing circuit 428, but also adjusts (e.g., reduces) a charging current of the battery pack 304. If an average cell voltage of the battery pack 304 is greater than a second preset voltage (e.g., 4.2V for Lithium Ion cells), the battery management system 400 charges the battery pack 304 in a constant voltage charging mode (e.g., a standard constant voltage charging mode $CV_0$), in one embodiment. The battery management system 400 also performs a protection check, in one embodiment.

The battery management system 400 starts charging the battery pack 304 and n (which represents different constant current charging modes) is initialized to 0 in block 502. A constant current charging mode $CC_n$ is enabled by the control signal 350 in block 504. For example, when n is set to 0, a standard current charging mode $CC_0$ will be enabled. When n is between 1 and max, a light current charging mode $CC_n$ (n=1,2, . . . , max) will be enabled. A protection check is performed in block 506. For example, the command converter 426 receives monitoring signals from the monitoring circuit 424 and determines whether any undesirable condition (e.g., over-voltage, over-current, and over-temperature) has occurred, in one embodiment. If there is any undesirable condition, the flowchart 500 goes to block 530 to terminate battery charging (charging termination mode). As such, the command converter 426 will switch off the charging switch 430 to terminate battery charging. If there is no undesirable condition, the flowchart 500 goes to block 508.

In block 508, an average cell voltage of the battery pack 304 is compared with a second preset voltage (e.g., 4.2V for Lithium Ion cells), for example, by the command converter 426, to determine whether a constant voltage charging mode (e.g., a standard constant voltage charging mode $CV_0$) can be enabled or not. In one embodiment, if the average cell voltage of the battery pack 304 is greater than the second preset voltage which indicates that the battery pack 304 can be charged in a constant voltage charging mode (e.g., a standard constant voltage charging mode $CV_0$), the flowchart 500 goes to block 524.

In block 524, the constant voltage charging mode (e.g., a standard constant voltage charging mode $CV_0$) is enabled by the control signal 350. In block 526, a protection check (similar to block 506) is performed. If there is any undesirable condition, the flowchart 500 goes to block 530 to terminate battery charging (charging termination mode). Otherwise, the flowchart 500 goes to block 528.

In block 528, if all the cells in the battery pack 304 are fully charged, the flowchart 500 goes to block 530 to terminate charging (charging termination mode). Otherwise, the flowchart 500 returns to block 524 and the battery pack 304 continues to be charged under a constant voltage charging mode (e.g., a standard constant voltage charging mode $CV_0$) as shown in block 524. In one embodiment, the command converter 426 receives voltage monitoring signals from the monitoring circuit 424 and determines whether all the cells are fully charged.

Returning to block 508, if the average cell voltage of the battery pack is less than the second preset voltage, which indicates that the battery pack 304 can still be charged in a standard/light constant current charging mode, the flowchart 500 goes to block 510.

In block 510, the highest cell voltage is compared with a first preset voltage (e.g., 3.9V for Lithium Ion cells), for example, by the command converter 426. The first preset voltage is used to determine whether to perform an unbalance check. In one embodiment, if the highest cell voltage is greater than the first preset voltage, the unbalance check will be performed and the flowchart 500 goes to block 512. If the highest cell voltage is less than the first preset voltage, the flowchart 500 returns to block 504. Any repetitive description following block 504 that has been described above will be omitted herein for purposes of clarity and brevity.

In block 512, an unbalance check is performed. If there is no unbalanced condition, the flowchart 500 returns to block 504. If there is any unbalanced condition, a bleeding current is enabled for any unbalanced cell (step not shown in flowchart 500 for purposes of brevity and clarity), and the flowchart 500 goes to block 514.

In block 514, a timer is started. In block 516, an average cell voltage of the battery pack 304 is compared with a second preset voltage (similar to block 508), for example, by the command converter 426, to determine whether a constant voltage charging mode (e.g., a standard constant voltage charging mode $CV_0$) can be enabled or not. In one embodiment, if the average cell voltage of the battery pack 304 is greater than the second preset voltage, which indicates that the battery pack 304 can be charged in a constant voltage charging mode (e.g., a standard constant voltage mode $CV_0$), the flowchart 500 goes to block 524. Any repetitive description following block 524 that has been described above will be omitted herein for purposes of clarity and brevity.

Returning to block 516, if the average cell voltage of the battery pack 304 is less than the second preset voltage, which indicates that the battery pack 304 can still be charged in a standard/light constant current charging mode, the flowchart 500 goes to block 518. In block 518, if the timer expires (e.g., the timer runs up to a predetermined time), the flowchart 500 goes to block 520. If the timer does not expire, the flowchart 500 returns to block 516.

In block 520, n is compared with a predetermined maximum number max, for example, by the command converter 426. If n is equal to the predetermined maximum number max, the flowchart 500 returns to block 504 to continue the light constant current mode $CC_{max}$. Otherwise, the flowchart 500 goes to block 522. In block 522, n is increased by 1 and the flowchart 500 returns to block 504 to start a new cycle. Because n has been increased by 1 in block 522 during the previous cycle, in this new cycle (current cycle), the charging current is adjusted from a first level in the previous cycle to a second level that is lower than the first level, in one embodiment. Any repetitive description following block 504 that has been described above will be omitted herein for purposes of clarity and brevity.

Figure 6:
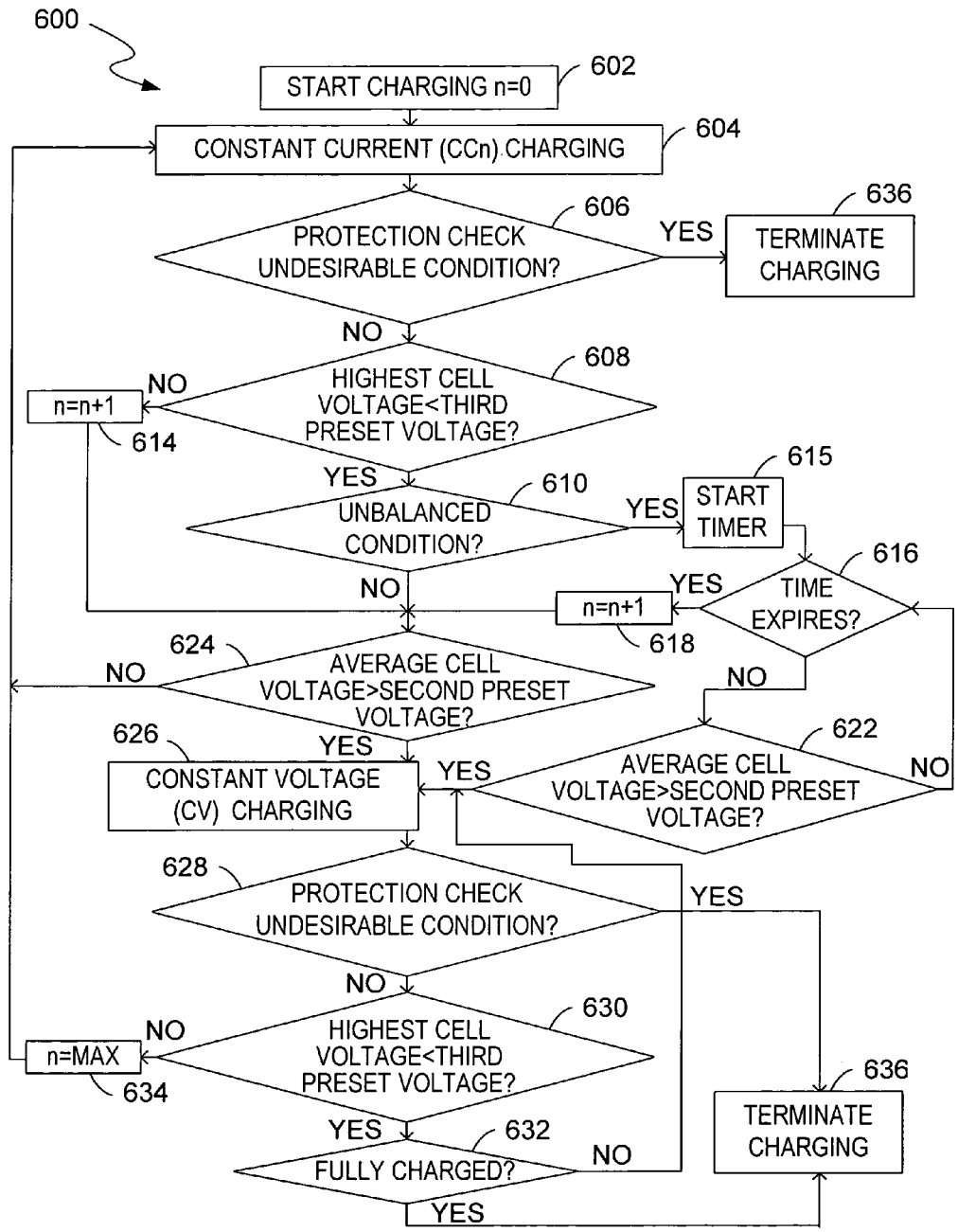
FIG. 6 shows another flowchart of operations performed by a battery management system, in accordance with one embodiment of the present invention.

FIG. 6 shows another flowchart 600 of operations performed by a battery management system 400, in accordance with one embodiment of the present invention. In one embodiment, the command converter 426 can be configured, such that the battery management system in FIG. 4 operates in a way shown in flowchart 600. FIG. 6 is described in combination with FIG. 3 and FIG. 4.

In the example of FIG. 6, the battery management system 400 charges the battery pack 304 in multiple cycles. The battery management system 400 first charges the battery pack 304 in a standard constant current charging mode $CC_0$, in one embodiment. The battery management system 400 charges the battery pack 304 in light constant current charging modes $CC_n$ (n=1,2, . . . , max) if an unbalanced condition and/or other undesirable conditions (e.g., an over-voltage condition)

occur, in one embodiment. If an average cell voltage of the battery pack 304 is greater than a second preset voltage (e.g., 4.2V for Lithium Ion cells), the battery management system 400 charges the battery pack 304 in a constant voltage charging mode (e.g., a standard constant voltage charging mode $CV_0$), in one embodiment. If a highest cell voltage of the battery pack 304 is greater than a third preset voltage (e.g., 4.3V for Lithium Ion cells) and the average cell voltage is less than the second preset voltage, the battery management system 400 changes a constant current charging mode from $CC_n$ to $CC_{n+1}$, thereby reducing the charging current to enable an over-voltage protection, in one embodiment. The battery management system 400 also performs protection check, in one embodiment.

The battery management system 400 charges the battery pack 304 in multiple cycles. The battery management system 400 starts charging the battery pack 304 and n (which represents different constant charging current modes) is initialized to 0 in block 602. Constant current charging mode $CC_n$ is enabled by the control signal 350 in block 604. For example, when n is set to 0, a standard current charging mode $CC_0$ will be enabled. When n is between 1 and max, a light current charging mode $CC_n$ (n=1,2, . . . , max) will be enabled. A protection check is performed in block 606. For example, the command converter 426 receives monitoring signals from the monitoring circuit 424 and determines whether any undesirable condition (e.g., over-voltage, over-current, and over-temperature) has occurred, in one embodiment. If there is any undesirable condition, the flowchart 600 goes to block 636 to terminate battery charging (charging termination mode). As such, the command converter 426 will switch off the charging switch 430 to terminate battery charging. If there is no undesirable condition, the flowchart 600 goes to block 608.

In block 608, a highest cell voltage is compared with third preset voltage, for example, by the command converter 426, in order to check if there is any over-voltage condition. If the highest cell voltage is greater than the third preset voltage (which can indicate that there is an over-voltage condition), the flowchart 600 goes to block 614. In block 614, n is increased by 1. The flowchart 600 goes to block 624 to check if a constant voltage charging mode (e.g., a standard constant voltage charging mode $CV_0$) can be enabled or not. If the highest cell voltage is less than the third preset voltage (which can indicate that there is no over-voltage condition), the flowchart 600 goes to block 610.

In block 610, an unbalance check is performed. In one embodiment, an unbalanced condition occurs if a voltage difference between two cells of the plurality of cells is greater than a predetermined voltage difference. If there is no unbalanced condition, the flowchart 600 goes to block 624 to check if a constant voltage charging mode (e.g., a standard constant voltage charging mode $CV_0$) can be enabled or not. If there is any unbalanced condition, a bleeding current is enabled for any unbalanced cell (step not shown in flowchart 600), and the flowchart 600 goes to block 615.

In block 615, a timer is started. In block 616, if the timer expires, the flowchart 600 goes to block 618 and n is increased by 1. The flowchart 600 goes to block 624 to check if a constant voltage charging mode (e.g., a standard constant voltage charging mode $CV_0$) can be enabled or not.

In block 624, an average cell voltage is compared with a second preset voltage, for example, by the command converter 426, in order to determine whether a constant voltage charging mode can be enabled or not. If the average cell voltage is less than the second preset voltage, the flowchart 600 returns to block 604 to start a new charging cycle. Because n has been increased by 1 in block 614 if an over-voltage condition is detected in block 608, or increased by 1 in block 618 if an unbalanced condition is detected in block 610 during the previous cycle, in this new cycle (current cycle), the charging current can be adjusted from a first level in the previous cycle to a second level that is lower than the first level. Any repetitive description following block 604 that has been described above will be omitted herein for purposes of clarity and brevity.

If the average voltage is greater than the second preset voltage, the flowchart 600 goes to block 626 to enable a constant voltage charging mode (e.g., a standard constant voltage mode $CV_0$).

Returning to block 616, if the timer does not expire, the flowchart 600 goes to block 622 (similar to block 624) to check if a constant voltage mode (e.g., a standard constant voltage charging mode $CV_0$) can be enabled or not. In block 622, an average cell voltage is compared with the second preset voltage, for example, by the command converter 426. If the average cell voltage is less than the second preset voltage, the flowchart 600 returns to block 616. Any repetitive description following block 616 that has been described above will be omitted herein for purposes of clarity and brevity. If the average cell voltage is greater than the second preset voltage, the flowchart 600 goes to block 626 to enable a constant voltage charging mode (e.g., a standard constant voltage charging mode $CV_0$).

In block 628, a protection check is performed (similar to block 606). If there is any undesirable condition, the flowchart 600 goes to block 636 to terminate battery charging (charging termination mode). If there is no undesirable condition, the flowchart 600 goes to block 630. In block 630, a highest cell voltage is compared with the third preset voltage (similar to block 608), for example, by the command converter 426, in order to check if there is any over-voltage condition. If the highest cell voltage is greater than the third preset voltage (which can indicate that there is an over-voltage condition), the flowchart 600 goes to block 634. In block 634, n is set to a predetermined maximum value max and the flowchart 600 returns to block 604. As such, a minimum charging current $1_{max}$ ($1_0 > 1_1 > 1_2 > \ldots > 1_{max}$) is enabled. If the highest cell voltage is less than the first preset voltage (which indicates that there is no over-voltage condition), the flowchart 600 goes to block 632. In block 632, if all the cells are fully charged, the flowchart 600 goes to block 636 to terminate charging. Otherwise, the flowchart 600 returns to block 626 to continue a constant voltage charging mode. Any repetitive description following block 626 that has been described above will be omitted herein for purposes of clarity and brevity.

Figure 7:
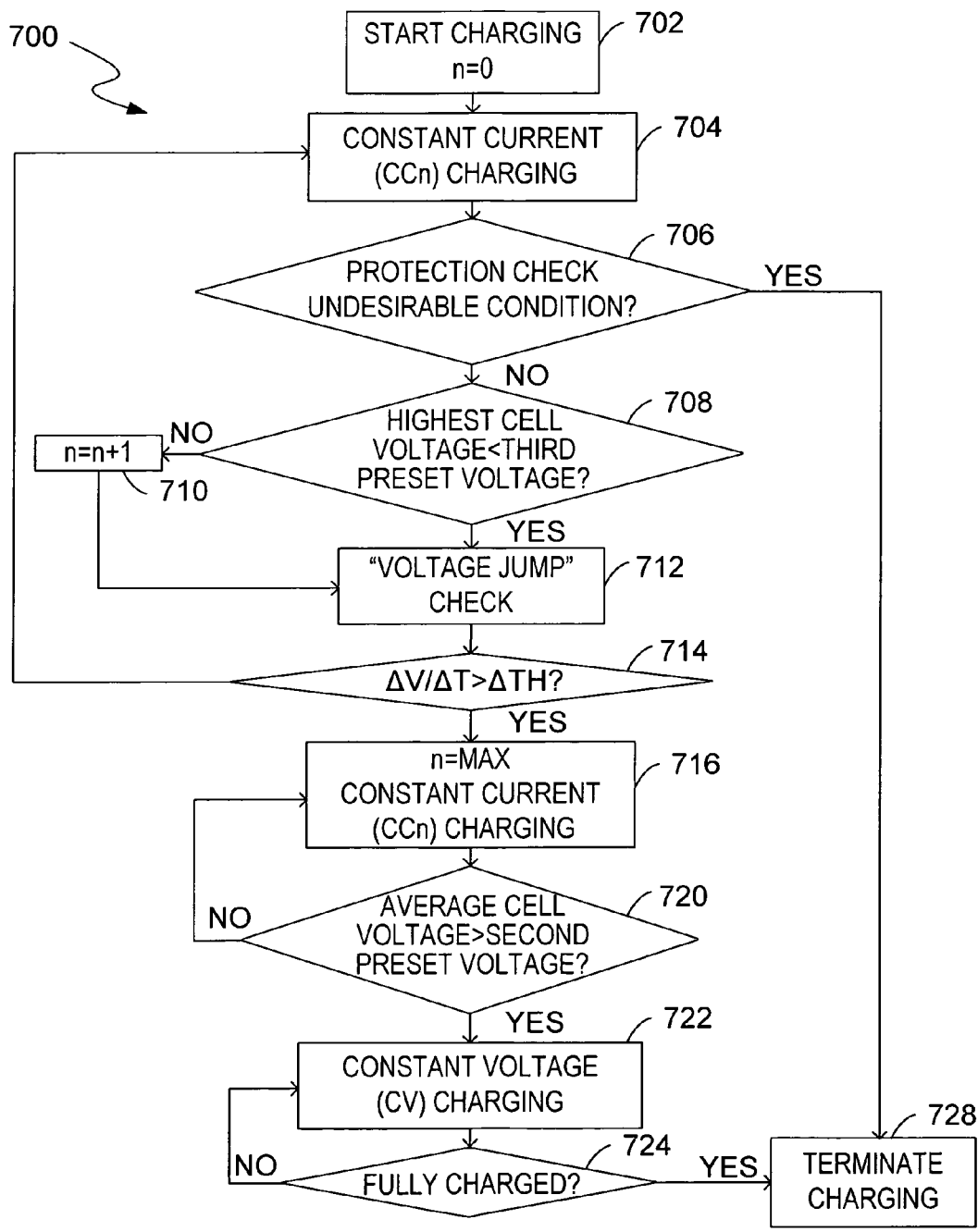
FIG. 7 shows another flowchart of operations performed by a battery management system, in accordance with one embodiment of the present invention.

FIG. 7 shows another flowchart 700 of operations performed by a battery management system 400, in accordance with one embodiment of the present invention. In one embodiment, for phosphate Lithium ion battery cells, a voltage of a cell increases rapidly after the cell reaches a certain voltage threshold (called "voltage jump"). As such, the flowchart 700 can be implemented to charge the phosphate Lithium ion battery cells by reducing a charging current when a "voltage jump" occurs, in one embodiment. In one embodiment, the command converter 426 can be configured, such that the battery management system in FIG. 4 operates in a way shown in flowchart 700. FIG. 7 is described in combination with FIG. 3 and FIG. 4.

In the example of FIG. 7, the battery management system 400 charges the battery pack 304 in multiple cycles. The battery management system 400 first charges the battery pack 304 in a standard constant current charging mode $CC_0$, in one embodiment. The battery management system 400 charges the battery pack 304 in light constant current charging modes $CC_n$ (n=1,2, ..., max) if any over-voltage condition occurs, in one embodiment. In one embodiment, an over-voltage condition occurs if the highest cell voltage of the battery pack 304 is greater than a third preset voltage (e.g., 4.3V for Lithium Ion cells). If there is a "voltage jump", the battery management system 400 charges the battery pack 304 in a light constant current charging mode (e.g., $CC_{max}$ with a minimum charging current $1_{max}$ ($l_0 > l_1 > l_2 > \ldots > l_{max}$)), in one embodiment. In one embodiment, a "voltage jump" is detected when an increase on a voltage (e.g., an individual cell voltage or an average cell voltage) over a time period $\Delta V/\Delta t$ is greater than a threshold level $\Delta$th. If an average cell voltage of the battery pack 304 is greater than a second preset voltage (e.g., 4.2V for Lithium Ion cells), the battery management system 400 charges the battery pack 304 in a constant voltage charging mode (e.g., a standard constant voltage charging mode $CV_0$), in one embodiment. The battery management system 400 also performs protection check, in one embodiment.

The battery management system 400 starts charging the battery pack 304 and n (which represents different constant charging current modes) is initialized to 0 in block 702. Constant current charging mode $CC_n$ is enabled by the control signal 350 in block 704. For example, when n is set to 0, a standard current charging mode $CC_0$ will be enabled. When n is between 1 and max, a light current charging mode $CC_n$ (n=1,2, ..., max) will be enabled. A protection check is performed in block 706. For example, the command converter 426 receives monitoring signals from the monitoring circuit 424 and determines whether any undesirable condition (e.g., over-voltage, over-current, and over-temperature) has occurred, in one embodiment. If there is any undesirable condition, the flowchart 700 goes to block 728 to terminate battery charging (charging termination mode). As such, the command converter 426 will switch off the charging switch 430 to terminate battery charging. If there is no undesirable condition, the flowchart 700 goes to block 708.

In block 708, a highest cell voltage is compared with a third preset voltage, for example, by the command converter 426, in order to determine if there is any over-voltage condition. If the highest cell voltage is greater than the third preset voltage (which can indicate that there is an over-voltage condition), the flowchart 700 goes to block 710. In block 710, n is increased by 1. The flowchart 700 then goes to block 712 to perform a "voltage jump" check. If the highest cell voltage is less than the third preset voltage (which can indicate that there is no over-voltage condition), the flowchart 700 goes to block 712 directly.

In block 714, if an increase on a voltage (e.g., an individual cell voltage or an average cell voltage) over a time period $\Delta V/\Delta t$ is less than a threshold level $\Delta$th, the flowchart 700 returns to block 704 to start a new cycle. Because n has been increased by 1 in block 710 if an over-voltage condition is detected in block 708, in this new cycle (current cycle), the charging current can be adjusted from a first level in the previous cycle to a second level that is lower than the first level. Any repetitive description following block 704 that has been described above will be omitted herein for purposes of clarity and brevity.

If the increase on a voltage (e.g., an individual cell voltage or an average cell voltage) over a time period $\Delta V/\Delta t$ is greater than the threshold level $\Delta$th, the battery pack 304 will be charged under a light constant current charging mode (e.g., $CC_{max}$) in block 716. In one embodiment, the control signal 350 will control the adapter 302 to output a constant charging current ($1_{max}$) to charge the battery 304.

In block 720, a constant voltage charging mode (CV) check is performed. More specifically, an average voltage of the battery pack 304 is compared with a second preset voltage to determine whether the constant voltage charging mode (e.g., a standard constant voltage charging mode $CV_0$) can be enabled. In block 720, if the average voltage of the battery pack 304 is less than the second preset voltage, which indicates that the battery pack 304 can still be charged in a light constant current mode, the flowchart 700 returns to block 716.

In block 720, if the average voltage of the battery pack 304 is greater than the second preset voltage, the battery pack 304 will be charged under a constant voltage charging mode (e.g., a standard constant voltage charging mode $CV_0$) in block 722. The flowchart 700 goes to block 724 to determine if all the cells are fully charged.

In block 724, if all the cells are fully charged, the charging process is terminated in block 728 (charging termination mode). Otherwise, the flowchart 700 returns to block 722 to continue charging the battery pack 102 under a constant voltage charging mode.

As described in relation to FIG. 5-FIG. 7, the battery pack 304 is charged under multiple constant current charging modes (e.g., standard constant current charging mode $CC_0$, light constant current charging mode $CC_1$-$CC_{max}$) and a constant voltage charging mode (e.g., a standard constant voltage charging mode $CV_0$), in one embodiment. Other charging methods can be implemented by configuring/programming the command converter 426. For example, the battery pack 304 can be charged under a constant current charging mode (e.g., a standard constant current charging mode $CC_0$) and multiple constant voltage charging modes (e.g., standard constant voltage charging mode $CV_0$, light constant voltage charging mode $CV_1$-$CV_{max}$), in one embodiment. The battery pack 304 can also be charged under multiple constant current charging modes (e.g., standard constant current charging mode $CC_0$, light constant current charging mode $CC_1$-$CC_{max}$) and multiple constant voltage charging modes (e.g., standard constant voltage charging mode $CV_0$, light constant voltage charging mode $CV_1$-$CV_{max}$), in one embodiment. Advantageously, the adapter 302 (charger) can receive monitoring information from the monitoring circuit 424, and can adjust the charging current from a first level in a previous cycle to a second level that is lower than the first level if an unbalanced condition and/or other undesirable conditions (e.g., over-voltage) are detected in the current cycle. Therefore, the battery pack 304 can have a longer balancing time such that all the cells, e.g., 310_1-310_3, can be fully charged and any undesirable condition can be avoided, in one embodiment.

Figure 8:
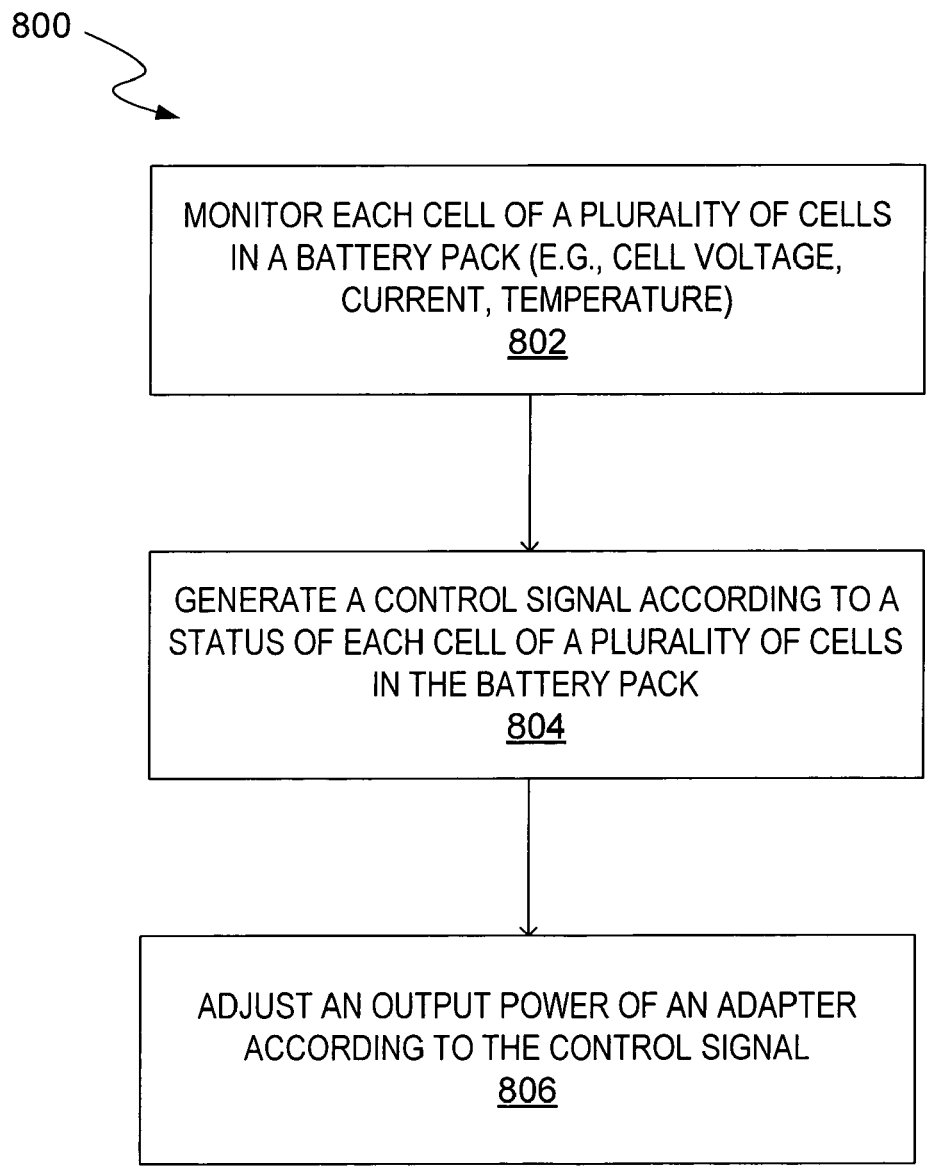
FIG. 8 shows a flowchart of operations performed by a battery management system, in accordance with one embodiment of the present invention.

FIG. 8 shows a flowchart 800 of operations performed by a battery management system 400, in accordance with one embodiment of the present invention. FIG. 8 is described in combination with FIG. 3 and FIG. 4.

As shown in FIG. 8, the battery management system 400 monitors each cell of a plurality of cells in a battery pack 304 in block 802. For example, a monitoring circuit 424 monitors cell voltage, current, and temperature, etc., and generates a monitoring signal for each cell indicative of a status of each cell.

In block 804, the battery management system 400 generates a control signal 350 according to the status of each cell of a plurality of cells in the battery pack 304. For example, the control signal 350 is generated according to monitoring signals 490_1-490_3, 492, and 494 as shown in FIG. 4.

In block 806, the battery management system 400 adjusts an output power of an adapter 302 according to the control signal 350. For example, the battery management system adjusts the output power of the adapter 302 by controlling a duty cycle of a pulse width modulation signal in the adapter 302.

Accordingly, a battery management system is provided. In one such embodiment, a battery pack is able to adjust an output power of an adapter directly by a control circuit integrated in the battery pack. Advantageously, the output power of the adapter is adjusted according to individual cell status. Therefore, multiple charging modes can be enabled according to individual cell status, in one embodiment. As such, battery charging can be terminated when all the cells are fully charged and any undesirable condition can be avoided, in one embodiment.

In one embodiment, multiple charging modes can also be enabled according to battery pack status instead of individual cell status. For example, a standard constant current charging mode can be enabled at the beginning of charging. A light constant current charging mode can be enabled when the battery pack voltage is greater than a first threshold, in one embodiment. A light constant current charging mode can also be enabled when an increase on a battery voltage over a time period is greater than a second threshold (which may indicate that an unbalanced condition occurs). A constant voltage charging mode can be enabled when the battery pack voltage is greater than a third threshold, in one embodiment.

In one embodiment, the present invention provides a battery management system with a controllable adapter output which can be adjusted according to battery pack status. In one such embodiment, the battery management system can adjust the adapter output according to battery pack status (e.g., battery pack voltage, battery pack current) to enable multiple charging modes (e.g., standard constant current charging mode, light constant current charging mode, standard constant voltage charging mode, light constant voltage charging mode). In one embodiment, battery charging will be terminated when all the cells are fully charged and any undesirable condition (e.g., over-voltage, over-charge, over-current) can be avoided.

Figure 9:
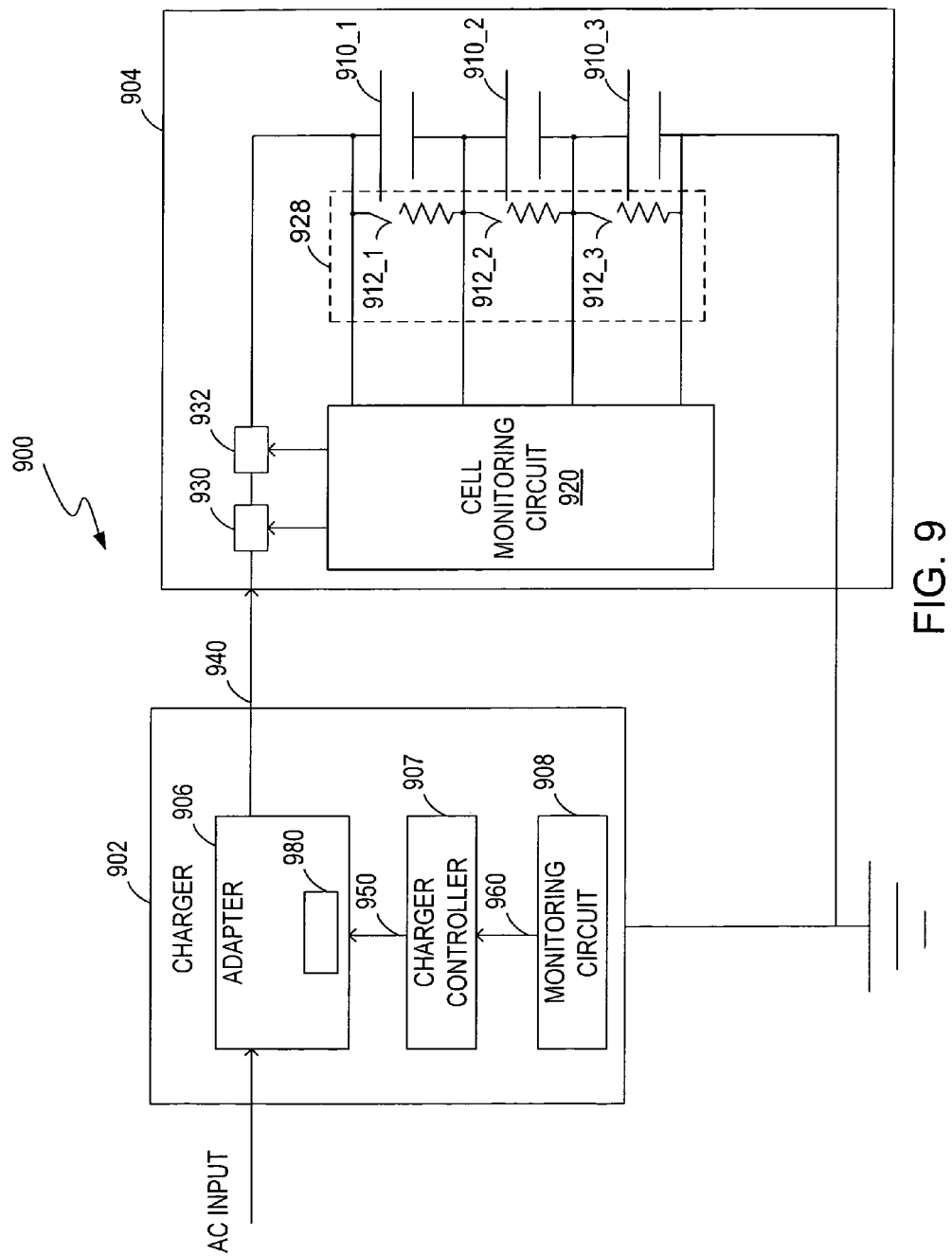
FIG. 9 shows a block diagram of a battery management system, in accordance with one embodiment of the present invention.

FIG. 9 shows a block diagram of a battery management system 900, in accordance with one embodiment of the present invention. The battery management system 900 includes a monitoring circuit 908 for monitoring a battery pack 904 including a plurality of cells, and for checking an unbalanced condition and/or other undesirable conditions (e.g., an over-voltage condition) of the battery pack 904 in each cycle of a plurality of cycles. In the example of FIG. 9, the battery pack 904 includes three cells 910_1, 910_2 and 910_3. However, any number of cells can be included in the battery pack 904. The battery management system 900 also includes a charger 902 for controlling a charging current to the battery pack 904 and for receiving monitoring information from the monitoring circuit 908, and for adjusting the charging current from a first level in a previous cycle to a second level that is lower than the first level if the unbalanced condition and/or other undesirable conditions (e.g., over-voltage, over-current, over-charge) are detected in a current cycle. The charger 902 includes an adapter 906 which can be controlled by a charger controller 907.

The charger 902 can provide a charging current/voltage via an output terminal 940. In one embodiment, the monitoring circuit 908 (e.g., a gas gauge circuit) is in the charger 902. The monitoring circuit 908 can monitor the battery pack status through the output terminal 940 of the charger 902, and can generate a monitoring signal 960 indicative of the status of the battery pack 904. In one embodiment, the monitoring circuit 908 monitors a battery pack voltage and generates a monitoring signal 960 indicating the battery pack voltage. In one embodiment, the monitoring circuit 908 monitors a charging current of the battery pack 904 and generates a monitoring signal 960 indicating the battery pack charging current. For example, the monitoring circuit 908 can monitor a differential in battery pack voltage (dV) with respect to a differential in charging time (dt) and generate a monitoring signal 960 indicating dV/dt. The monitoring circuit 908 can also monitor a differential in battery pack charging current (dI) with respect to a differential in charging time (dt) and generates a monitoring signal 960 indicating dI/dt.

The monitoring signal 960 generated by the monitoring circuit 908 is delivered to the charger controller 907. The charger controller 907 generates a control signal 950 for controlling an output power of the adapter 906 in order to enable multiple charging modes. More specifically, the charger controller 907 can be used to generate a control signal 950 according to a status of the battery pack (e.g., a battery pack voltage, a battery pack charging current, a differential in battery pack voltage with respect to a differential in charging time, a differential in battery pack current with respect to a differential in charging time, and an increase on the battery pack voltage over a time period). Advantageously, an output power of the adapter 906 can be adjusted according to the control signal 950.

In one embodiment, the monitoring circuit 908 and the charger controller 907 are integrated in the charger 902. As such, the charger 902 is able to adjust an output power of the adapter 906 according to the status of the battery pack 904. Therefore, a communication channel between the charger 902 and the battery pack 904 can be avoided.

Advantageously, the battery management system 900 can enable multiple charging modes for the battery pack 904 according to the battery pack voltage. In one embodiment, the charger controller 907 enables, but is not limited to, a standard constant current charging mode $CC_n$ (n=0), one or more light constant current charging modes $CC_n$ (n=1,2, ..., max, where max is a predetermined maximum number of n, which indicates the number of different light constant current charging modes), a standard constant voltage charging mode $CV_m$ (m=0), one or more light constant voltage charging modes $CV_m$ (m=1,2, ..., max', where max' is a predetermined maximum number of m, which indicates the number of different light constant voltage modes), and a charging termination mode. In one embodiment, a light constant current charging mode or a light constant voltage charging mode can be enabled when an unbalanced condition and/or other undesirable conditions are detected. In one embodiment, the charging termination mode can be enabled when any undesirable/error condition occurs or when the battery pack is fully charged.

Advantageously, a standard constant current charging mode $CC_0$ is enabled when the control signal 950 controls the adapter 906 to provide a substantially constant charging current $I_0$ at the output terminal 940, in one embodiment. As such, the battery pack 904 is charged by a substantially constant charging current $I_0$. A light constant current charging mode $CC_n$ (n=1, 2, ..., max) is enabled when the control signal 950 controls the adapter 906 to provide a substantially constant light charging current $I_n$ (n=1, 2, ..., max) at the output 940, in one embodiment. As such, the battery pack 904 is charged by a substantially constant light charging current $I_n$ (n=1, 2, ..., max). In one embodiment, $I_0 > I_1 > I_2 > ... > I_{max}$.

Similarly, a standard constant voltage charging mode $CV_0$ is enabled when the control signal 950 controls the adapter 906 to provide a substantially constant charging voltage $V_0$ at the output 940, in one embodiment. As such, the battery pack 904 is charged by a substantially constant charging voltage $V_0$. A light constant voltage charging mode $CV_m$ (m=1, 2, ..., max') is enabled when the control signal 950 controls the adapter 906 to provide a substantially constant light charging voltage $V_m$(m=1, 2, ..., max') at the output 940, in one embodiment. As such, the battery pack 904 is charged by a substantially constant light charging voltage $V_m$(m=1, 2, ..., max'). In one embodiment, $V_0 > V_1 > V_2 > ... > V_{max'}$.

Advantageously, by enabling different charging modes ($CC_0, CC_1, ... CC_{max}$ and $CV_0, CV_1, ..., CV_{max'}$) according to the battery pack status, the battery pack 904 can be fully charged and any undesirable condition can be avoided, thereby extending the battery life.

In one embodiment, the adapter 906 includes a pulse width modulation signal generator 980. The control signal 950 can be used to control a duty cycle of a pulse width modulation signal generated by the pulse width modulation signal generator 980. By adjusting the duty cycle of the pulse width modulation signal, the output power of the adapter 906 at output 940 can be adjusted accordingly. In other words, different charging modes can be enabled by controlling the duty cycle of the pulse width modulation signal in the adapter 906, in one embodiment. For example, if a standard constant current charging mode ($CC_0$) needs to be enabled according to battery pack status, the control signal 950 will adjust the duty cycle of the pulse width modulation signal, such that the adapter 906 outputs a substantially constant current $I_0$.

In one embodiment, a cell monitoring circuit 920 (e.g., a gas gauge circuit) is configured to monitor a cell status (e.g., cell voltage, cell current, cell temperature, and cell capacity) for each individual cell 910_1, 910_2 and 910_3, and protect each cell 910_1, 910_2 and 910_3 from an unbalanced condition and other undesirable conditions (e.g., over-voltage, over-current, over-temperature, and over-charge). In one embodiment, the cell monitoring circuit 920 is integrated in the battery pack 904, and is capable of controlling a charging switch 930 and a discharging switch 932 in the battery pack 904, in one embodiment. The charging switch 930 can be switched off by the cell monitoring circuit 920 if an undesirable condition occurs, and the charging switch 930 can be switched on by the cell monitoring circuit 920 if the undesirable condition is eliminated. The discharging switch 932 will be switched on when the battery pack 904 provides power to a system load (not shown in FIG. 9 for purposes of brevity and clarity), in one embodiment.

In one embodiment, a balancing circuit 928 for balancing cells 910_1-910_3 is included in the battery pack 304 in order to further improve the performance of cells 910_1-910_3. The balancing circuit 928 can be implemented outside the cell monitoring circuit 920 or inside the cell monitoring circuit 920. A bleeding current (bypass current) can be enabled by the balancing circuit 928 for an unbalanced cell in order to balance the unbalanced cell. As shown in the balancing circuit 928, a bleeding current of cell 910_1 is enabled when a switch 912_1 is switched on. A bleeding current of cell 910_2 is enabled when a switch 912_2 is switched on. A bleeding current of cell 910_3 is enabled when a switch 912_3 is switched on. Switches 912_1-912_3 can be controlled by the cell monitoring circuit 920.

Figure 10:
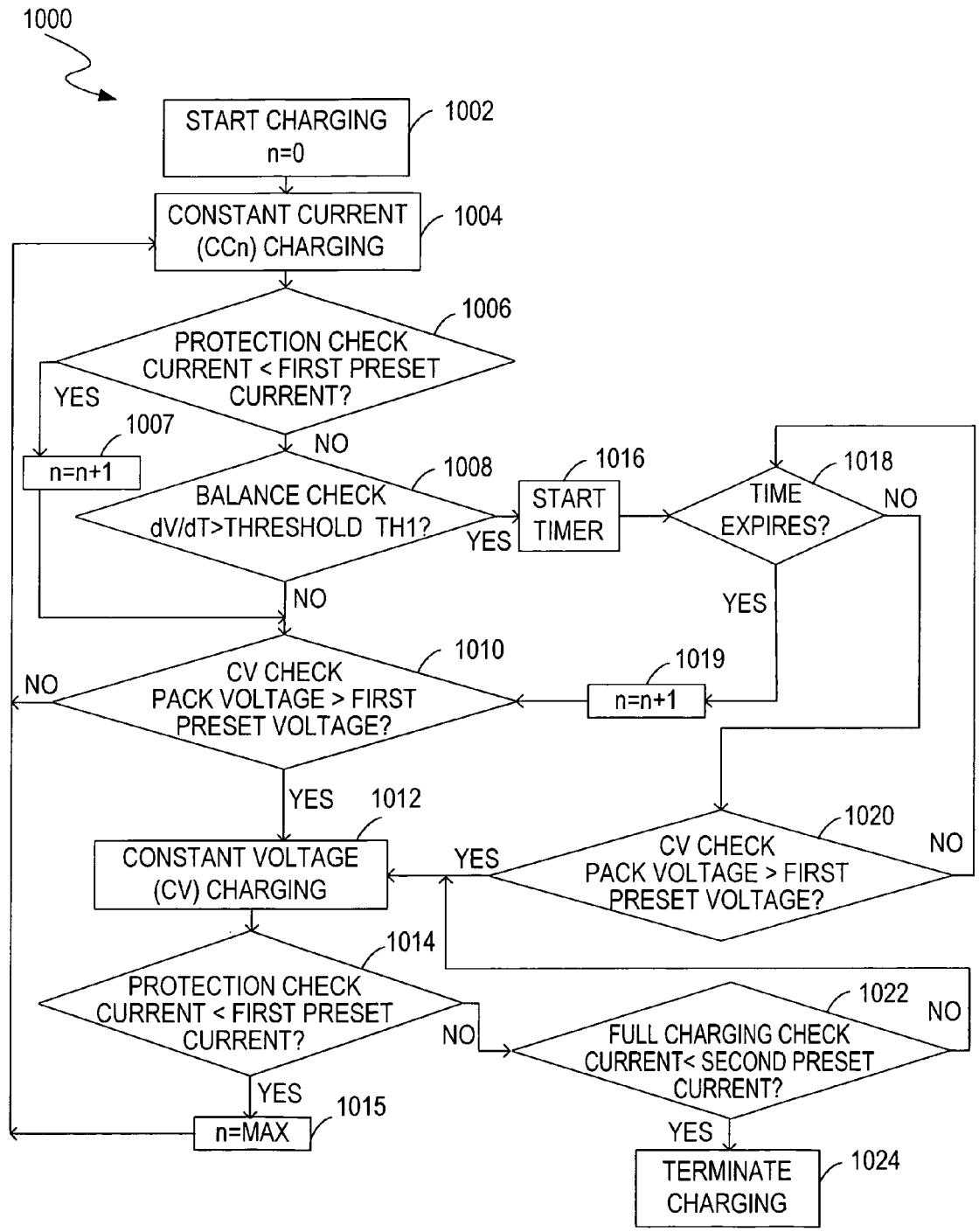
FIG. 10 shows a flowchart of operation performed by a battery management system, in accordance with one embodiment of the present invention.

FIG. 10 shows a flowchart 1000 of operations performed by a battery management system 900, in accordance with one embodiment of the present invention. In one embodiment, the charger controller 907 controls the adapter 906, such that the battery management system 900 in FIG. 9 operates in a way shown in flowchart 1000. More specifically, flowchart 1000 illustrates which charging mode will be enabled by the charger controller 907 according to different battery pack status, in one embodiment. FIG. 10 is described in combination with FIG. 9.

In the example of FIG. 10, the battery management system 900 charges the battery pack 904 in multiple cycles. The battery management system 900 first charges the battery pack 904 in a standard constant current charging mode $CC_0$, in one embodiment. The battery management system 900 charges the battery pack 904 in light constant current charging modes $CC_n$ (n=1,2,..., max) if an unbalanced condition and/or other undesirable conditions (e.g., an over-voltage condition) occur, in one embodiment. If a battery pack voltage is greater than a first preset voltage, the battery management system 900 charges the battery pack 904 in a constant voltage charging mode (e.g., a standard constant voltage charging mode $CV_0$), in one embodiment. The battery management system 900 also performs a balance check by comparing a differential in battery pack voltage with respect to a differential in charging time (dV/dt) with a predetermined threshold TH1, in one embodiment.

The battery management system 900 starts charging the battery pack 904 and n (which represents different constant current charging modes) is initialized to 0 in block 1002. A constant current charging mode $CC_n$ is enabled by the control signal 950 in block 1004. For example, when n is set to 0, a standard current charging mode $CC_0$ will be enabled. When n is between 1 and max, a light current charging mode $CC_n$ (n=1,2,..., max) will be enabled.

A protection check is performed in block 1006 to determine if any undesirable condition (e.g., over-voltage, over-current, and over-temperature) has occurred. For example, the monitoring circuit 908 monitors the battery pack 904 through the output terminal 940 of the charger 902 and determines that an undesirable condition occurs if the charging current is less than a first predetermined current value. If the charging current is less than the first predetermined current value (which can indicate that there is an undesirable condition (e.g., over-voltage, over-current, and over-temperature)), the flowchart 1000 goes to block 1007. In block 1007, n is increased by 1. In an alternate embodiment, if any undesirable condition (e.g., over-voltage, over-current, and over-temperature) has occurred, the cell monitoring circuit 920 can switch off the charging switch 930 and therefore the charging current can be reduced to zero. If the charging current is greater than the first predetermined current value (which can indicate that there is no undesirable condition, the flowchart 1000 goes to block 1008.

In block 1008, a balance check is performed to detect if an unbalanced condition has occurred. In one embodiment, a differential in battery pack voltage with respect to a differential in charging time (dV/dt) is compared with a preset threshold TH1. If dV/dt is greater than TH1, which can indicate that an unbalanced condition has occurred, the flowchart 1000 goes to block 1016. If dV/dt is less than TH1, the flowchart 1000 goes to block 1010.

In block 1016, a timer is started. In block 1018, if the timer expires (e.g., the timer runs up to a predetermined time), the flowchart 1000 goes to block 1019 and n is increased by 1, and the flowchart 1000 goes to block 1010 to perform a CV check.

In block 1010, a CV check is performed. In one embodiment, the battery pack voltage is compared with a first preset voltage, for example, by the monitoring circuit 908, to determine whether a constant voltage charging mode can be enabled or not. If the battery pack voltage is less than the first preset voltage, the flowchart 1000 returns to block 1004 to start a new charging cycle. Because n is increased by 1 in block 1007 if an undesirable condition is detected in block 1006, or is increased by 1 in block 1019 if an unbalanced condition is detected in block 1008 during the previous cycle, in this new charging cycle (current cycle), the charging current can be adjusted from a first level in a previous cycle to a second level that is lower than the first level. In one embodiment, the new cycle is started after a predetermined time when the unbalanced condition is detected in block 1008. Any repetitive description following block 1004 that has been described above will be omitted herein for purposes of clarity and brevity. If the battery pack voltage is greater than the first preset voltage, the flowchart 1000 goes to block 1012 to enable a constant voltage charging mode (e.g., a standard constant voltage mode $CV_0$).

Returning to block 1018, if the timer does not expire, the flowchart 1000 goes to block 1020 to perform a CV check (similar to block 1010) to check if a constant voltage mode (e.g., a standard constant voltage charging mode $CV_0$) can be enabled or not. In block 1020, the battery pack voltage is compared with a first preset voltage, for example, by the monitoring circuit 908. If the battery pack voltage is less than the first preset voltage, the flowchart 1000 returns to block 1018. Any repetitive description following block 1018 that has been described above will be omitted herein for purposes of clarity and brevity. If the battery pack voltage is greater than the first preset voltage, the flowchart 1000 goes to block 1012 to enable a constant voltage charging mode (e.g., a standard constant voltage mode $CV_0$).

In block 1014, a protection check is performed (similar to block 1006). For example, the monitoring circuit 908 monitors the charging current and determines whether the charging current is less than a first preset current value. If the charging current is less than the first preset current value (which can indicate that there is an undesirable condition), the flowchart 1000 goes to block 1015. In block 1015, n is set to a predetermined maximum value max and the flowchart 1000 returns to block 1004. As such, a minimum charging current $l_{max}$ ($l_0 > l_1 > l_2 > \ldots > l_{max}$) can be enabled. In an alternate embodiment, if any undesirable condition (e.g., over-voltage, over-current, and over-temperature) has occurred, the cell monitoring circuit 920 can switch off the charging switch 930, thus reducing the charging current to zero. If the charging current is greater than the first preset current value (which can indicate that there is no undesirable condition, the flowchart 1000 goes to block 1022. In block 1022, a full charging check is performed. For example, the monitoring circuit 908 monitors the charging current and determines whether the charging current is less than a second preset current value. If the charging current is less than the second preset current value (which can indicate that the battery pack 904 is fully charged), the flowchart 1000 goes to block 1024 to terminate charging. If the charging current is greater than the second preset current value (which can indicate that the battery pack 904 is not fully charged), the flowchart 1000 return to block 1012 to continue a constant voltage charging mode (e.g., a standard constant voltage mode $CV_0$). Any repetitive description following block 1012 that has been described above will be omitted herein for purposes of clarity and brevity.

Figure 11:
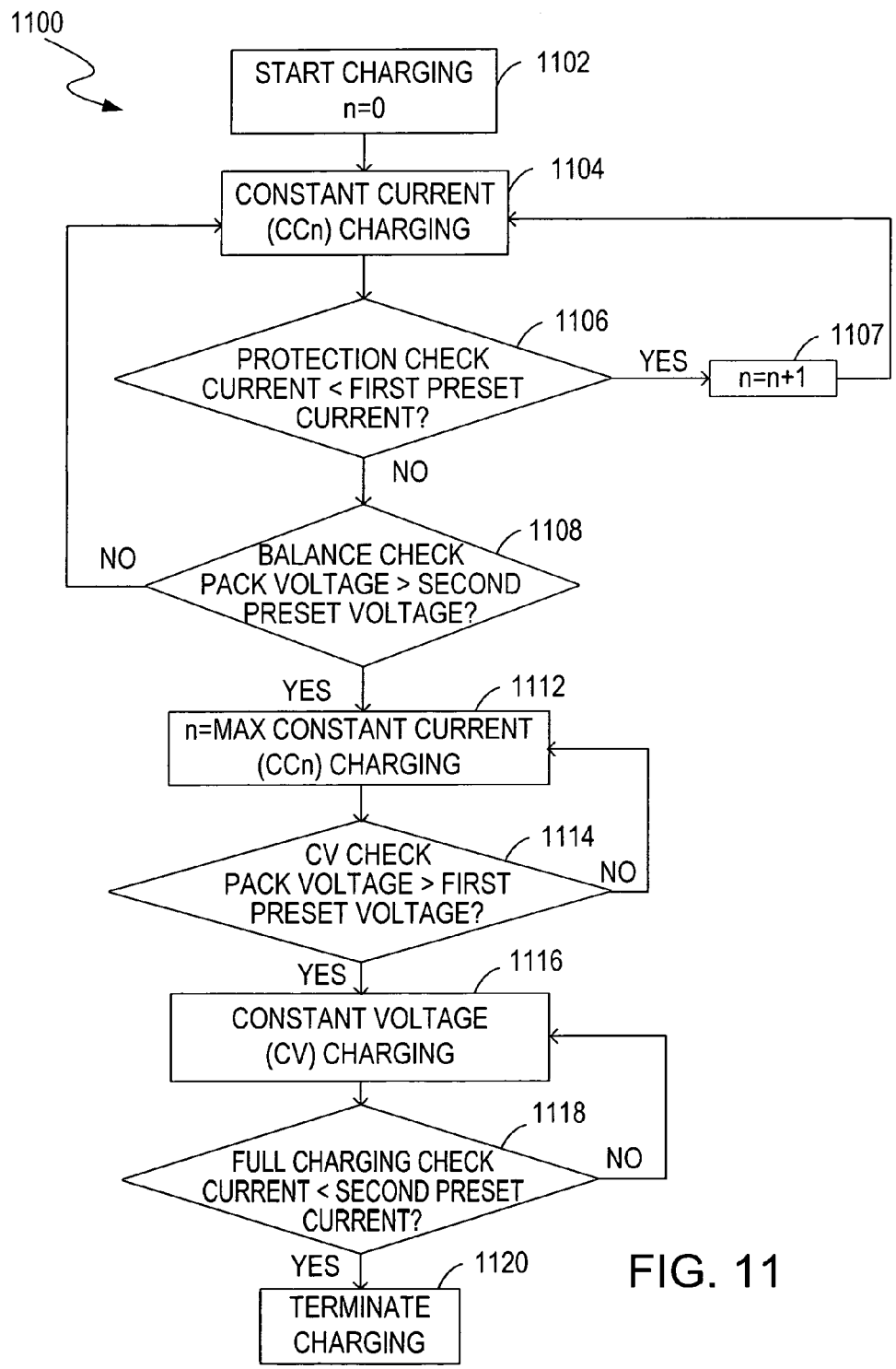
FIG. 11 shows another flowchart of operation performed by a battery management system, in accordance with one embodiment of the present invention.

FIG. 11 shows another flowchart 1100 of operations performed by a battery management system 900, e.g., for charging phosphate lithium ion battery cells, in accordance with one embodiment of the present invention. In one embodiment, the charger controller 907 controls the adapter 906, such that the battery management system in FIG. 9 operates in a way shown in flowchart 1100. FIG. 11 is described in combination with FIG. 9.

In the example of FIG. 11, the battery management system 900 charges the battery pack 904 in multiple cycles. The battery management system 900 first charges the battery pack 904 in a standard constant current charging mode $CC_0$, in one embodiment. The battery management system 900 charges the battery pack 904 in light constant current charging modes $CC_n$ (n=1,2, . . . , max) if an unbalanced condition and/or other undesirable conditions (e.g., over-voltage condition) occur, in one embodiment. If a battery pack voltage is greater than a first preset voltage, the battery management system 900 charges the battery pack 904 in a constant voltage charging mode (e.g., a standard constant voltage charging mode $CV_0$), in one embodiment.

The battery management system 900 starts charging the battery pack 904 and n (which represents different constant charging current modes) is initialized to 0 in block 1102. Constant current charging mode $CC_n$ is enabled by the control signal 950 in block 1104. For example, when n is set to 0, a standard current charging mode $CC_0$ will be enabled. When n is between 1 and max, a light current charging mode $CC_n$ (n=1,2, . . . , max) will be enabled. A protection check is performed in block 1106. For example, the monitoring circuit 908 monitors the charging current and determines whether the charging current is less than a first preset current value. If the charging current is less than the first preset current value (which can indicate that there is an undesirable condition), the flowchart 1100 goes to block 1107. In block 1107, n is increased by 1. The flowchart 1100 then goes back to block 1104 to start a new charging cycle. Because n has been increased by 1 in block 1107 if an undesirable condition is detected during the previous cycle, in this new charging cycle (current cycle), the charging current can be adjusted from a first level in a previous cycle to a second level that is lower than the first level. In an alternate embodiment, if any undesirable condition (e.g., over-voltage, over-current, and over-temperature) has occurred, the cell monitoring circuit 920 can switch off the charging switch 930, thus reducing the charging current to zero. If the charging current is greater than the first preset current value (which can indicate that there is no undesirable condition), the flowchart 1100 goes to block 1108 directly.

In block 1108, a balance check is performed by comparing the battery pack voltage with a second preset voltage. In one embodiment, an unbalanced condition occurs if the battery pack voltage of the battery pack 904 is greater than the second preset voltage, and then the flowchart 1100 returns to block 1104. Otherwise the flowchart 1100 goes to 1112. Any repetitive description following block 1104 that has been described above will be omitted herein for purposes of clarity and brevity.

In block 1112, the battery pack 904 will be charged under a light constant current charging mode (e.g., $CC_{max}$). In one embodiment, the control signal 950 will control the adapter 906 to output a substantially constant charging current ($l_{max}$) to charge the battery pack 904.

In block 1114, a CV check is performed to check if a constant voltage mode (e.g., a standard constant voltage charging mode $CV_0$) can be enabled or not. In block 1114, the battery pack voltage is compared with a first preset voltage, for example, by the monitoring circuit 908. If the battery pack voltage is less than the first preset voltage, the flowchart 1100 returns to block 1112. Any repetitive description following block 1112 that has been described above will be omitted herein for purposes of clarity and brevity. If the battery pack voltage is greater than the first preset voltage, the flowchart 1100 goes to block 1116 to enable a constant voltage charging mode (e.g., a standard constant voltage mode $CV_0$). Then the flowchart 1100 goes to block 1118 to perform a full charging check.

In block 1118, a full charging check is performed. For example, the monitoring circuit 908 monitors the charging current and determines whether the charging current is less than a second preset current. If the charging current is less than the second preset current (which can indicate that the battery pack is fully charged), the flowchart 1100 goes to block 1120 to terminate charging. If the charging current is greater than the second preset current (which can indicate that the battery pack is not fully charged), the flowchart 1100 return to block 1116 to continue a constant voltage charging mode (e.g., a standard constant voltage mode $CV_0$). Any repetitive description following block 1116 that has been described above will be omitted herein for purposes of clarity and brevity.

Figure 12:
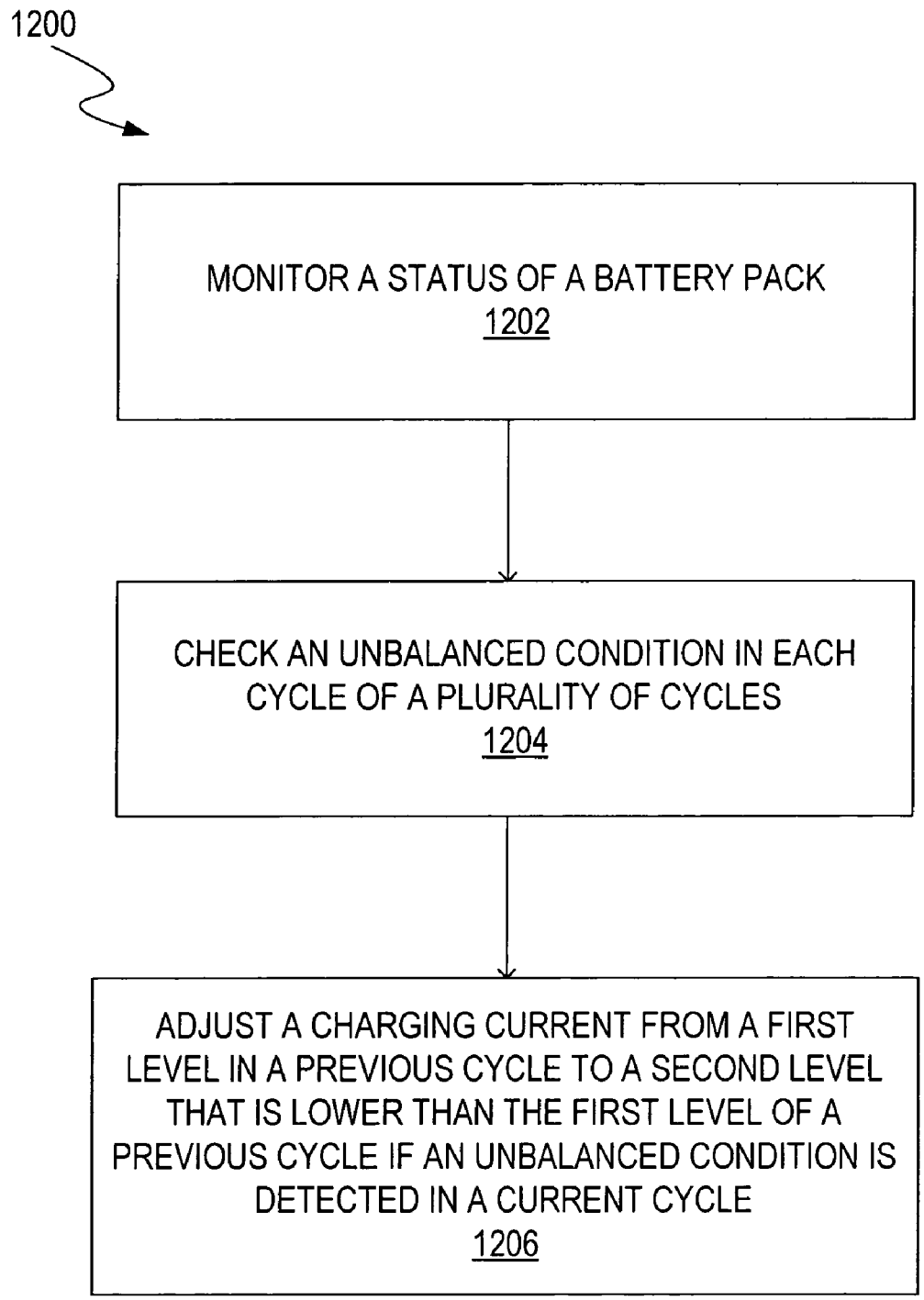
FIG. 12 shows a flowchart of operation performed by a battery management system, in accordance with one embodiment of the present invention.

FIG. 12 shows a flowchart 1200 of operations performed by a battery management system 400/900, in accordance with one embodiment of the present invention. FIG. 12 is described in combination with FIG. 4 and FIG. 9.

As shown in FIG. 12, the battery management system 400/900 monitors a status of a battery pack 904 in block 1202. In one embodiment, as shown in FIG. 4, a monitoring circuit 424 integrated in the battery pack 304 monitors a cell voltage of each cell of the battery pack 304, and the monitoring information is transferred from the monitoring circuit 424 to the charger (e.g., adapter 302) via a communication channel. In another embodiment, as shown in FIG. 9, a monitoring circuit 908 integrated in the charger 902 monitors a battery pack voltage and/or a charging current of the battery pack through the output terminal 940.

In block 1204, an unbalanced condition in each cycle of a plurality of cycles can be checked/detected by the monitoring circuit, e.g., the monitoring circuit 424 in FIG. 4 or the monitoring circuit 908 in FIG. 9. The operation can further include checking/detecting an undesirable condition (e.g., over-voltage, over-current, over-temperature, over-charge) in each cycle of a plurality of cycles by the monitoring circuit 424 or 908.

In one embodiment, the monitoring circuit 424 determines that an unbalanced condition occurs if a voltage difference between two cells of the plurality of cells is greater than a predetermined voltage difference. In one embodiment, the monitoring circuit 908 determines that an unbalanced condition occurs if a differential in battery pack voltage with respect to a differential in charging time is greater than a predetermined threshold. In one embodiment, the monitoring circuit 908 determines that an unbalanced condition occurs if a battery pack voltage of the battery pack is greater than a predetermined voltage. In one embodiment, the monitoring circuit 908 determines that an undesirable condition occurs if the charging current is less than a predetermined current value.

In block 1206, the battery management system 400/900 adjusts a charging current provided by the charger 902 from a first level in a previous cycle to a second level that is lower than the first level if an unbalanced condition is detected in a current cycle. For example, the battery management system 400 adjusts the charging current from the adapter 302 by controlling a duty cycle of a pulse width modulation signal in the adapter 302, and the battery management system 900 adjusts the charging current from the adapter 906 by controlling a duty cycle of a pulse width modulation signal in the adapter 906. The operation can further include adjusting the charging current provided by the charger (e.g., adapter 302 or charger 902) from the first level in the previous cycle to a third level that is lower than the first level if an undesirable condition is detected in the current cycle.

Accordingly, embodiments in accordance with the present invention provide battery management systems that can charge the battery packs in multi-phases. Advantageously, as described above, the battery management system can charge the battery pack with a smaller charging current (light constant current charging mode) when an unbalanced condition and/or other undesirable conditions occur. Therefore, a balancing circuit can have a longer time to perform cell balancing (by enabling bleeding current) in order to fully charge all the cells, and any undesirable condition can be avoided.

While the foregoing description and drawings represent embodiments of the present invention, it will be understood that various additions, modifications and substitutions may be made therein without departing from the spirit and scope of the principles of the present invention as defined in the accompanying claims. One skilled in the art will appreciate that the invention may be used with many modifications of form, structure, arrangement, proportions, materials, elements, and components and otherwise, used in the practice of the invention, which are particularly adapted to specific environments and operative requirements without departing from the principles of the present invention. The presently disclosed embodiments are therefore to be considered in all respects as illustrative and not restrictive, the scope of the invention being indicated by the appended claims and their legal equivalents, and not limited to the foregoing description.

What is claimed is:

1. A battery management system comprising:
    a monitoring circuit for monitoring a battery pack that comprises a plurality of cells and for checking an unbalanced condition of said cells in each cycle of a plurality of cycles; and
    a charger external to said battery pack and operable for generating a charging current at an output terminal of said charger to said battery pack and for receiving monitoring information from said monitoring circuit, and for adjusting said charging current at said output terminal from a first level in a previous cycle to a second level that is lower than said first level in response to a detection of said unbalanced condition of said cells in a current cycle,
    wherein said monitoring circuit is further capable of checking an undesirable condition of said battery pack in each cycle of said plurality of cycles, and wherein said charger is further capable of adjusting said charging current from said first level in said previous cycle to a third level that is lower than said first level in response to a detection of said undesirable condition in a current cycle.

2. The battery management system as claimed in claim 1, wherein said battery pack comprises a balancing circuit for balancing said plurality of cells if said unbalanced condition is detected.

3. The battery management system as claimed in claim 1, further comprising:
    a communication channel coupled between said battery pack and said charger for transferring said monitoring information from said monitoring circuit to said charger, wherein said monitoring circuit is in said battery pack, and wherein said monitoring information indicates a cell voltage for each cell of said plurality of cells.

4. The battery management system as claimed in claim 1, wherein said unbalanced condition occurs if a voltage difference between two cells of said plurality of cells is greater than a predetermined voltage difference.

5. The battery management system as claimed in claim 1, wherein said monitoring circuit is capable of monitoring said battery pack through said output terminal of said charger, and wherein said monitoring information indicates a battery pack voltage of said battery pack.

6. The battery management system as claimed in claim 1, wherein said unbalanced condition occurs if a differential in battery pack voltage with respect to a differential in charging time is greater than a predetermined threshold.

7. The battery management system as claimed in claim 1, wherein said unbalanced condition occurs if a battery pack voltage of said battery pack is greater than a predetermined voltage.

8. The battery management system as claimed in claim 1, wherein said charger adjusts said charging current to said second level after a predetermined time when said unbalanced condition is detected.

9. The battery management system as claimed in claim 1, further comprising:
   a communication channel coupled between said battery pack and said charger for transferring monitoring information from said monitoring circuit to said charger,
   wherein said monitoring circuit is in said battery pack, and wherein said monitoring information indicates a cell voltage for each cell of said plurality of cells.

10. The battery management system as claimed in claim 1, wherein said battery pack is operable for switching off a charging switch if said undesirable condition is detected.

11. The battery management system as claimed in claim 1, wherein said undesirable condition comprises an over-voltage condition.

12. The battery management system as claimed in claim 1, wherein said monitoring circuit is capable of monitoring said battery pack through said output terminal of said charger, and wherein said monitoring circuit detects said undesirable condition if said charging current is less than a predetermined current value.

13. A method for charging a battery pack having a plurality of cells, comprising:
   monitoring a status of said battery pack;
   checking an unbalanced condition of said cells in each cycle of a plurality of cycles;
   controlling a charger external to said battery pack to adjust a charging current at an output terminal of said charger to said battery pack from a first level in a previous cycle to a second level that is lower than said first level in response to a detection of said unbalanced condition of said cells in a current cycle;
   checking an undesirable condition of said battery pack in each cycle of a plurality of cycles; and
   adjusting said charging current of said battery pack from said first level in said previous cycle to a third level that is lower than said first level in response to a detection of said undesirable condition in a current cycle.

14. The method of claim 13, further comprising:
   balancing said plurality of cells if said unbalanced condition is detected.

15. The method of claim 13, further comprising:
   determining that said unbalanced condition occurs if a voltage difference between two cells of said plurality of cells is greater than a predetermined voltage difference.

16. The method of claim 13, further comprising:
   monitoring said status of said battery pack through said output terminal of said charger,
   wherein said monitoring information indicates a battery pack voltage of said battery pack.

17. The method of claim 13, further comprising:
   determining that said unbalanced condition occurs if a differential in battery pack voltage with respect to a differential in charging time is greater than a predetermined threshold.

18. The method of claim 13, further comprising:
   determining that said unbalanced condition occurs if a battery pack voltage is greater than a predetermined voltage.

19. The method of claim 13, further comprising:
   adjusting said charging current to said second level after a predetermined time when said unbalanced condition is detected.

20. The method of claim 13, further comprising:
   transferring said monitoring information from said monitoring circuit to said charger via a communication channel between said battery pack and said charger,
   wherein said monitoring information indicates a cell voltage for each cell of said plurality of cells.

21. The method of claim 13, wherein said undesirable condition comprises an over-voltage condition.

22. The method of claim 13, further comprising:
   switching off a charging switch if said undesirable condition is detected.

23. The method of claim 13, further comprising:
   determining that said undesirable condition occurs if said charging current is less than a predetermined current value.

* * * * *